(12) United States Patent
Litvin et al.

(10) Patent No.: US 8,402,665 B2
(45) Date of Patent: Mar. 26, 2013

(54) METHOD, APPARATUS, AND DEVICES FOR PROJECTING LASER PLANES

(75) Inventors: Timothy John Litvin, Santa Cruz, CA (US); Scott T. Y. Luan, Pacifica, CA (US)

(73) Assignee: Kimokeo Inc., Santa Cruz, CA (US)

( * ) Notice: Subject to any disclaimer, the term of this patent is extended or adjusted under 35 U.S.C. 154(b) by 332 days.

(21) Appl. No.: 12/874,531

(22) Filed: Sep. 2, 2010

(65) Prior Publication Data

US 2012/0055035 A1 Mar. 8, 2012

(51) Int. Cl.
*G01C 5/00* (2006.01)
(52) U.S. Cl. .......................... 33/290; 33/474
(58) Field of Classification Search ............ 33/276, 33/277, 278, 279, 280, 290, 291, 292
See application file for complete search history.

(56) References Cited

U.S. PATENT DOCUMENTS

| | | | |
|---|---|---|---|
| 5,782,003 A * | 7/1998 | Bozzo | 33/291 |
| 5,864,956 A * | 2/1999 | Dong | 33/276 |
| 6,539,638 B1 * | 4/2003 | Pelletier | 33/290 |
| 7,178,250 B2 * | 2/2007 | Nash et al. | 33/290 |
| 7,469,481 B2 * | 12/2008 | Nash et al. | 33/286 |
| 2010/0313433 A1 * | 12/2010 | Hayashi et al. | 33/291 |
| 2011/0131824 A1 * | 6/2011 | Yanobe et al. | 33/292 |

\* cited by examiner

*Primary Examiner* — G. Bradley Bennett

(57) ABSTRACT

An apparatus is disclosed, along with methods and constituent devices, for generating omnidirectional planar projections for an exemplary laser application to provide visual references for the construction field. The preferred embodiment utilizes a convex cone lens, the lateral surface of which provides for total internal reflection, to disperse the incident beam. The curvatures of the interior and exterior surfaces of a toroidal ring lens normalize and athermalize the dispersed beam such that the resulting projection is orthogonal to the incident beam throughout an operable temperature range. Alternate optical embodiments are also disclosed which utilize various means of dispersal and normalization such as a conical reflector, concave cone lens, double-prism ring and well-adapted spherical lenses. The preferred embodiment is adapted as a portable construction tool by additionally disclosed components including a path-compression prism assembly, an adjustable tripod support adapted to a structural base assembly, and various embodiments of a lens-shield concept.

51 Claims, 15 Drawing Sheets

3A

3B

3C

15A

15B

METHOD, APPARATUS, AND DEVICES FOR PROJECTING LASER PLANES

BACKGROUND

1. Technical Field

The present invention relates to the field of projecting laser light or other electromagnetic radiation. More specifically, the present invention relates to systems, methods, and optical devices utilized in the conversion of a laser point source to produce a laser reference plane. Such substantially planar and omnidirectional laser projection finds, among many uses, surveying and leveling applications in the construction industry.

2. Prior and Related Art

The technology of generating omnidirectional and planar projections from laser sources is relevant to many sensory and fiduciary applications. Machine-vision inspection systems may require illumination over a given plane. Illumination planes may also be used as datum or reference markers in augmented reality systems. Without limiting the scope of the present invention, the following discussion is provided in the context of the specific problem of generating accurate visual reference planes for use in the construction industry. The requirements of this specific application are illustrative of the difficulties involved in the generation of a planar projection from a laser source and the technical advantages of the invention.

A survey of prior art reveals five types of approaches to converting a laser point source into a planar projection. These approaches can be categorized as including: (a) rotating elements, (b) conical reflector, (c) cone lens, (d) cylindrical lens, and (e) fiber-optic bundle.

The first approach rotates a laser source or optical components (such as prisms or mirrors) to mechanically trace an omnidirectional (i.e., 360 degrees) projection plane. Prior art such as U.S. Pat. Nos. 4,062,634 (Rando) and 4,830,489 (Cain) disclose embodiments that are vulnerable to mechanical vibrations, gyroscopic forces, misalignment, and degradation of component surfaces. The embodiments that involve physical motion not only require high manufacturing and assembly costs with precision components and extensive alignments but also are susceptible to the harsh environmental and field conditions common in the construction industry.

The second approach eliminates the complications resulting from physical motion by utilizing one or more conical reflectors. The incident beam, directed towards the apex of the conical reflector along its axis of rotational symmetry, is reflected by the lateral surface into an omnidirectional planar projection. U.S. Pat. No. 4,111,564 (Trice) teaches a variation of the inventive concept. The "distance-variable planar diffusion" embodiment includes a configuration of two reflecting cones mutually opposed and axially aligned. The incident beam passes through a hollow central portion of the first cone and is reflected by the lateral surface of the second cone. Thereafter, the reflection is received by the lateral surface of the first cone and reflected into a planar projection. The planarity of the resulting projection can theoretically be achieved by the appropriate curvature of the lateral surfaces and distance between them. In practice, embodiments utilizing one or more conical reflectors require precise alignment of the incidence angle of the beam with respect to the axes of rotational symmetry of the reflectors. Over long distances, a slight misalignment will result in significant deviation of the projection from the desired plane. The specific teachings of U.S. Pat. No. 5,335,244 (Duncan) that address these difficulties in alignment are ill-suited for the rugged demands of the construction trades.

The third approach utilizes cone lenses to convert a laser beam into a planar projection. Concave and convex cone lenses are commonly manufactured as purely refractive optical elements. U.S. Pat. No. 6,754,012 B2 (Terauchi) and U.S. Pat. No. 4,111,564 (Trice) teach the utilization of concave cone lenses with lateral surfaces coated with reflective film to redirect an incident laser beam through the interior of the lens body to be emitted from the circumferential bounding surface of the lens. A planar projection that is orthogonal to the optical axis can be achieved by a calculated balance of the apex angle of the concavity, the refractive index of the lens material, and the angle of the bounding surface in accordance with Snell's law of refraction. U.S. Pat. No. 6,754,012 B2 (Terauchi) teaches a variation of this third approach in which the incident beam is redirected at the lateral surface by total internal reflection thereby eliminating the need for a reflective coating. For embodiments that include cone lenses, like those which utilize conical reflectors, the planarity of the resulting projection is extremely sensitive to the alignment of the incidence angle of the beam with respect to the optical axis of the cone lens. Furthermore, since cone lenses introduce thermal dependencies, as governed by the thermoptic coefficient of the lens material, the planarity and orthogonality of the resulting projection varies as the index of refraction changes with temperature. Over long distances, small changes in temperature would result in substantial deviations of the resulting projection.

The fourth approach utilizes various convex and concave curvatures of cylindrical lenses to disperse an incident beam into a projected fan of laser light. While also characterized by the exigencies of its own particular optical alignment and by similar susceptibilities to temperature variations, cylindrical lenses are limited by a more prohibitive shortcoming in that the projected fan or plane is not omnidirectional. Thus, cylindrical lenses find limited relevance to construction applications that require more expansive reference planes.

The last approach, as taught by U.S. Pat. No. 5,898,809 (Taboada), takes advantage of the "localization of light" phenomenon in a conventional fiber-optic bundle given an orthogonally-incident laser beam. There are several disadvantages of this approach for the specific application of generating laser reference planes. Even though individual fibers may be consistently uniform, the bundling process may result in variations and irregularities that limit the accuracy of the projected plane over long distances. Compensation for such deviations using a calibration process would be difficult due to the complexity and number of material interfaces. These interfaces would also argue for conversion inefficiencies that may adversely impact system design. Furthermore, similar to the prior art discussed above, this approach does not teach how to compensate for thermal effects due the wide variation in ambient temperature in the construction field.

The five types of approaches to converting a laser point source into a planar projection, as described above, do not teach or suggest utilizing ring lenses, prism-rings, or spherical lenses. Ring lenses as found in U.S. Pat. No. 1,774,842 (Peters) and App. Pub. No. U.S. 2007/0205961 (Black) are relevant to applications in which the accuracy of the resulting image or projection is not critical (such as lighthouse illumination and RF transmission). Prism-ring lenses, as taught by prior art such as U.S. Pat. No. 6,016,223 (Suzuki) and U.S. Pat. No. 5,191,479 (Tsuchida), consist of a plurality of refractive prism surfaces that are used for beam shaping in applications which require specific projections (such as double- Bessel beam) or for applications in which the accuracy of the resulting image or projection is not critical (such as Fresnel lenses). Prism-ring lenses, as taught by U.S. Pat. No. 6,616,305 (Simon), may also have a plurality of reflecting prisms for specific lighting applications. However, none of the prior art for prism-ring lenses teaches a plurality of reflective and/or refractive concentric prisms that redirect the incident beam in a serial or compound manner in which the emitted beam from one prism is received by another prism.

SUMMARY

The deficiencies of the various approaches and prior art discussed above highlight some of the difficulties involved in the generation of a planar projection from a laser source. These challenges include planar accuracy, thermal stability, alignment sensitivity, robustness, and omnidirectionality. All of these factors are relevant to the generation of reference planes for use in the construction industry. Without limiting its relevance to other applications, the invention will be disclosed and described in the context of the specific problem of generating accurate visual reference planes for use in the construction field.

The present invention, described in the most general terms, overcomes the aforementioned difficulties by a two-step process in which the incident beam is initially dispersed and subsequently normalized so that the resulting projection is orthogonal to the direction of incident beam. The optical elements that serve to normalize a dispersed beam are relatively insensitive of spatial misalignment, deviations, or perturbations due to its refractive nature and long focal length. The means for normalization of the dispersed beam cooperate with the means for dispersing the incident beam to achieve a combined effect that compensates for the temperature-dependent optical properties exhibited by both means. Athermalization is achieved by precisely drawn optical-surface curvatures spanning at a minimum the entire operable temperature range of the apparatus. In practice, the curvature includes length tolerances required for calibration which involves alignment of the normalizing elements with respect to the dispersal elements so that planarity (and orthogonality, by design) is achieved. Whether the normalizing or dispersal elements are fixed or translated along a common geometric axis of rotation depends on the particular requirements of a specific embodiment.

The preferred embodiment of the invention utilizes a convex cone lens to disperse the incident beam. The base of the cone lens receives the incident beam which is transmitted through the body of the lens and is redirected at the lateral surface by total internal reflection. The dispersed beam emitted from the cone lens at another point along the lateral surface is received by the interior surface of a ring lens. The curvatures of the interior and exterior surfaces of the ring lens normalize the dispersed beam so that the resulting projection is orthogonal to the optical axis of the cone lens.

The curvatures of the ring lens are modeled on and extrapolated from point-wise solutions for compensatory gradients adapted for specific angles of incidence of the beam dispersed by the cone lens at different temperatures. Each location along the effective length of the optical surface of the ring lens corresponds to the path of the dispersed beam at a certain temperature and serves to normalize the dispersed beam at that temperature. Numerical as well as analytical methods can integrate over point-wise solutions to arrive at a complete curvature. Therefore, the effective length of the optical surface of the ring lens spans the operable temperature range (and the calibration tolerances) of the apparatus. Unlike prior art, the ring lens functions as an compensatory element with an optical surface only a portion of which is utilized at any given time. Since the ring lens is a compensatory element that self-reflexively compensates for its own temperature dependence, the curvature also accounts for the thermoptic properties of the ring lens itself. The ring lens, with its long focal length being more reasonably tolerant of positioning errors, allows for precise calibration, and is relatively insensitive to mechanical perturbations. Specifically, post-assembly calibration merely involves translating the ring lens (with respect to other components) along the axis of the optical assembly, thereby allowing more sensitive components such as cone lenses, reflectors, and prism-rings to be mechanically coupled, optically aligned (with respect to the incident beam), and securely positioned within the protective interior volume of the toroidal ring lens during the assembly operation of the manufacturing process.

Given the relatively long focal length of the ring lens, the preferred embodiment of the disclosed projection apparatus also requires a path-compression prism assembly to achieve a compactness of design that is crucial for portable construction tools. The disclosed path-compression prism assembly may be comprised of commonly available optical elements such as Porro prisms, right-angle prisms, or mirrors to realize a path-compression ratio (defined as the ratio of the optical path length to the in-line thickness of the prism assembly) that is approximately twice that of Pechan prisms. Unlike a Delta or Pechan prism in which the transmitted beam remains within a single plane, the invention teaches a compression plane that is orthogonal to the direction of incidence and emission. Two reflective faces deflect the incident beam into and out of the path-compression plane defined by the closed circuitous path of the reflected beam. The prism assembly thus obtains the in-line path compression required by the disclosed projection apparatus. The inventive concept also has other technical advantages that are generally relevant to projection devices and other applications. For example, the prism assembly is easily scalable to accommodate longer path lengths with or without changing the clear aperture size.

The preferred embodiment of an apparatus for generating laser reference planes also includes specific configurations and components that are adapted for use in the construction field. Also disclosed are a base assembly that includes three sets of plane-generating optics for projecting three mutually-orthogonal and omnidirectional planes, a stable tripod structure adapted to the base assembly so that the omnidirectional laser projections are unobstructed, and various embodiments of a retractable lens-shield concept which protect the optics without altering the optical characteristics of the projection apparatus.

Finally, variations on the inventive concept of generating planar projections are also suggested and disclosed as alternative embodiments. The means for dispersing the incident beam may be realized by a conical reflector, concave cone lens, purely-refractive convex cone lens, or spherical lens. Alternatively, the incident beam may be dispersed by a prism-ring lens adapted to function in a compound manner in which the emitted beam from one prism is received and further dispersed by another prism. In another alternate embodiment, the means for normalization is achieved by well-adapted spherical lenses rather than a ring lens. The foregoing variations accord with the spirit and teachings of the inventive concept which, providing simultaneous solutions for the problems of planar accuracy, thermal stability, alignment sensitivity, and ruggedness, is directly applicable for use in the construction field and may benefit other industries with similarly demanding requirements.

The Detailed Description and its prefatory remarks, in conjunction with the Drawings introduced below, provide further elaboration on the preferred and alternate embodiments. With a comprehensive understanding of the invention, it should be appreciated, however, that the invention encompasses any modifications, alternative embodiments, and variations that fall within the scope of the claims.

DETAILED DESCRIPTION

Figure 1:
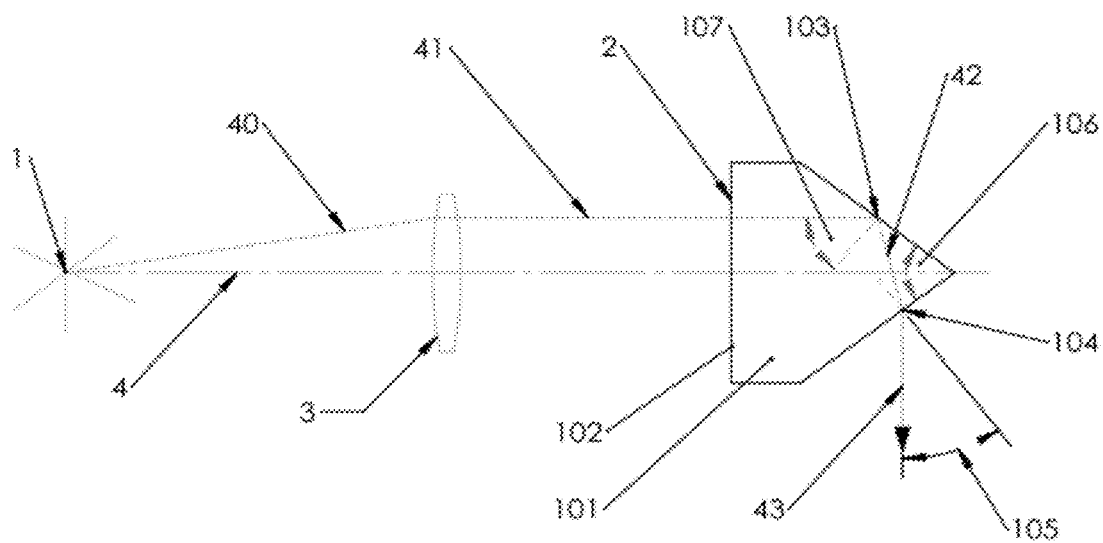
FIG. 1 is a diagrammatic cross-sectional view of the convex cone lens utilized in the preferred embodiment for an axially-symmetric incident beam.

The detailed description of the preferred and alternate embodiments of a projection apparatus for generating omnidirectional laser reference planes will be organized as follows:

1. Preferred Embodiment
1.1 Convex Cone Lens
1.2 Ring Lens
1.3 Path-Compression Prism Assembly
1.4 Non-optical Components
2. Alternate Optical Embodiments
2.1 Axicon, Double-Prism Ring, and Ring Lens
2.2 Axicon, Spherical Reflector, and Ring Lens
2.3 Concave Cone Lens and Ring Lens
2.4 Conical Reflector and Ring Lens
2.5 Other Variations
3. Claims In the first section, the discussion of the preferred embodiment introduces the fundamental teachings of the invention. In the second section, alternate optical embodiments will be considered in light of this teaching so that technical advantages of the preferred embodiment may also be realized by other implementations. Discussed in section 2.4 will be a variation of the invention that realizes only some of the technical advantages and allows for a reduced number of components to minimize manufacturing costs for applications with less demanding requirements. Thus, by way of substitution and subtraction, variations of the inventive concept will be discussed to arrive at the theme or spirit of the invention which encompasses and suggests other embodiments, only some of which are described in section 2.5.

It is also to be understood that the Detailed Description limits discussion of the invention to a specific application which requires omnidirectional planar projections of laser sources. While "omnidirectionality" refers to a range no less than 360 degrees about a source and "planarity" specifies a substantially flat projection, the invention may be adapted to particular applications that require more limited directionality (less than 360 degrees), curved (non-flat) projections, divergent or collimated sources of non-visible electromagnetic radiation such as infrared or UV.

Finally, the Detailed Description should be prefaced by the following brief clarification of terms and assumptions. Even though a "ray" is an idealized portion of a "beam," both terms will be used interchangeably in describing how light is redirected and projected. "Athermalization" refers specifically to athermalization of planarity of the reference projection. Athermalization of focus, however, is less critical since the magnitude of the optical power of the ring lens is relatively small compared to that of other optics utilized in the projection apparatus. By design, when properly calibrated, the projection apparatus is over-determined so that planar projections are always orthogonal. It is also to be understood that drawings depict non-orthogonal angles and ray paths that are exaggerated for the sake of clarity.

"Orthogonality" and "normality" are used interchangeably to denote a projective direction that is perpendicular to an optical axis or direction of incidence. However, it should also be noted that "orthogonality" does not refer to the registration or alignment of the planar projection to actual physical datums. The utilization of precision tilt sensors to assist in the alignment of the reference projections is within reach of those skilled in the art. For example, electrolytic or MEMS-type level sensors may be incorporated into an automatic feedback loop to actuate and align the projection optics to produce true vertical and horizontal planes. Also within reach of those skilled in the art are optical configurations and elements (e.g., lenses, prisms, and mirrors) to direct a beam emitted by a laser source along a particular direction. Therefore, the description will assume a disclosed projection apparatus that does not require additional redirection optics.

Furthermore, although the scope of the inventive concept includes oblique cones, frustums, other conic surfaces, cones consisting of a plurality of sections (or lack thereof) each comprising of different materials, or even cones made from gradient-index or other specialized material, in the discussion below, a "cone" refers specifically to a right circular cone of uniform material. Optical components, defined to be coaxial, have geometric axes of rotational symmetry that are coincident. Since the optical axes of most coaxial components are also coincident, the term "optical axis," for want of brevity and in the general context of an optical assembly, will be used interchangeably with the geometric axis of rotational symmetry. Coaxial optics are also assumed to be concentric from a perspective along the optical axis or, as the case may be, along an axis of rotational symmetry that is not coincident with the optical axis. The central axes of beams emitted from laser sources are assumed to be coincident with the geometric axis of concentricity.

1.1 Convex Cone Lens

The preferred embodiment utilizes a convex cone lens 101, as shown in FIG. 1, that is adapted for receiving an incident beam 41 along the optical axis 4 at the base surface 102 either directly from a laser source 1 or from optics, positioned between the base surface and the laser source, that collimate, focus, or redirect the beam. In the former case, the base surface 102 may include a beam-shaping curvature to focus or collimate the divergent beam received directly from the laser source. In the latter case, as depicted in FIG. 1, the incident ray 41 received by the base surface 102 is collimated by lens 3. After passing through the body of the lens, the ray is initially reflected 42 by the lateral surface 2 of the cone lens. With an apex angle 106 that guarantees an incidence angle 107 with respect to the normal of the lateral surface 2 that is greater than the critical angle of the cone lens material, total internal reflection 103 can be achieved to completely redirect the ray through the interior of the lens body. The reflected ray 42 is subsequently emitted from the lens body at another point 104 on the lateral surface at an angle of refraction 105. The resulting direction of the dispersed ray 43 depends on the apex angle 106 of the cone lens, the index of refraction of the lens material, and the wavelength of the beam.

With the additional constraint that the dispersed beam 43 is orthogonal to the optical axis 4, the apex angle 106 can be expressed in terms of the index of refraction of the cone lens material. Specifically, assuming the index of refraction of the ambient medium is unity, according to Snell's principle, the relationship between the cone's half-angle ($\alpha$) and the index of refraction (N) may be expressed as $\sin(\alpha) = -N*\cos(3\alpha)$, a function that allows for material selection and linearization within reasonable manufacturing tolerance. Therefore, for a given lens material, an appropriate conical geometry can be determined based on an apex angle calculated to produce an orthogonal projection of the incident ray. The resulting projection of the entire beam will form a plane extending omnidirectionally from and orthogonal to optical axis 4.

If the dispersed beam 43 is orthogonal to the optical axis 4 at temperature $T_0$, then changes in the index of refraction due to variations in temperature, as governed by the thermoptic coefficient of the lens material, will result in deviations of the dispersed beam from the desired orthogonal plane. The magnitude of the thermoptic coefficient will determine the extent to which the projection is nonplanar. Depending on the sign of the coefficient, the angle of refraction 105 at temperature $T_0+\Delta T$ will be greater or less than the angle of refraction at $T_0$. Dispersed beams that are non-orthogonal will resemble conical projections the central axes of which are coincident with the optical axis.

If temperature $T_0$ is the midpoint of an operable temperature range and the beam dispersed by the convex cone lens is orthogonal to the optical axis at that temperature, then the cone lens is defined as a "normal" cone lens. However, if the angle of refraction 105 at the midpoint temperature $T_0$ is greater than that which will result in an orthogonally dispersed beam, the cone lens will be defined as an "obtuse" cone lens producing a conical projection that is an "obtusely" dispersed beam. Furthermore, if the angle of refraction 105 at the midpoint temperature $T_0$ is less than that which will result in an orthogonally dispersed beam, the cone lens will be defined as an "acute" cone lens producing a conical projection that is an "acutely" dispersed beam. For example, a glass cone lens may produce an obtusely dispersed beam while a polymeric cone lens of the same geometry may result in an acutely dispersed beam. However, beams dispersed acutely or obtusely are dispersed along the optical axis 4.

The apex of the cone lens, due to manufacturing difficulties, commonly exhibit surface distortions that may be magnified into conspicuous irregularities of the projected reference plane. To improve the quality of the projection, the optical power delivered to the problematic apex region may be minimized by operating a laser source in the preferred TEM01** donut mode, shunting the optical surface near the apex region, or expanding the beam into the undistorted region of the clear aperture of the cone lens. Common and readily-available Galilean or Keplerian beam expanders can also be utilized at the location occupied by lens 3 to collimate and expand a divergent beam 40 emitted directly from laser source 1.

1.2 Ring Lens

Figure 2:
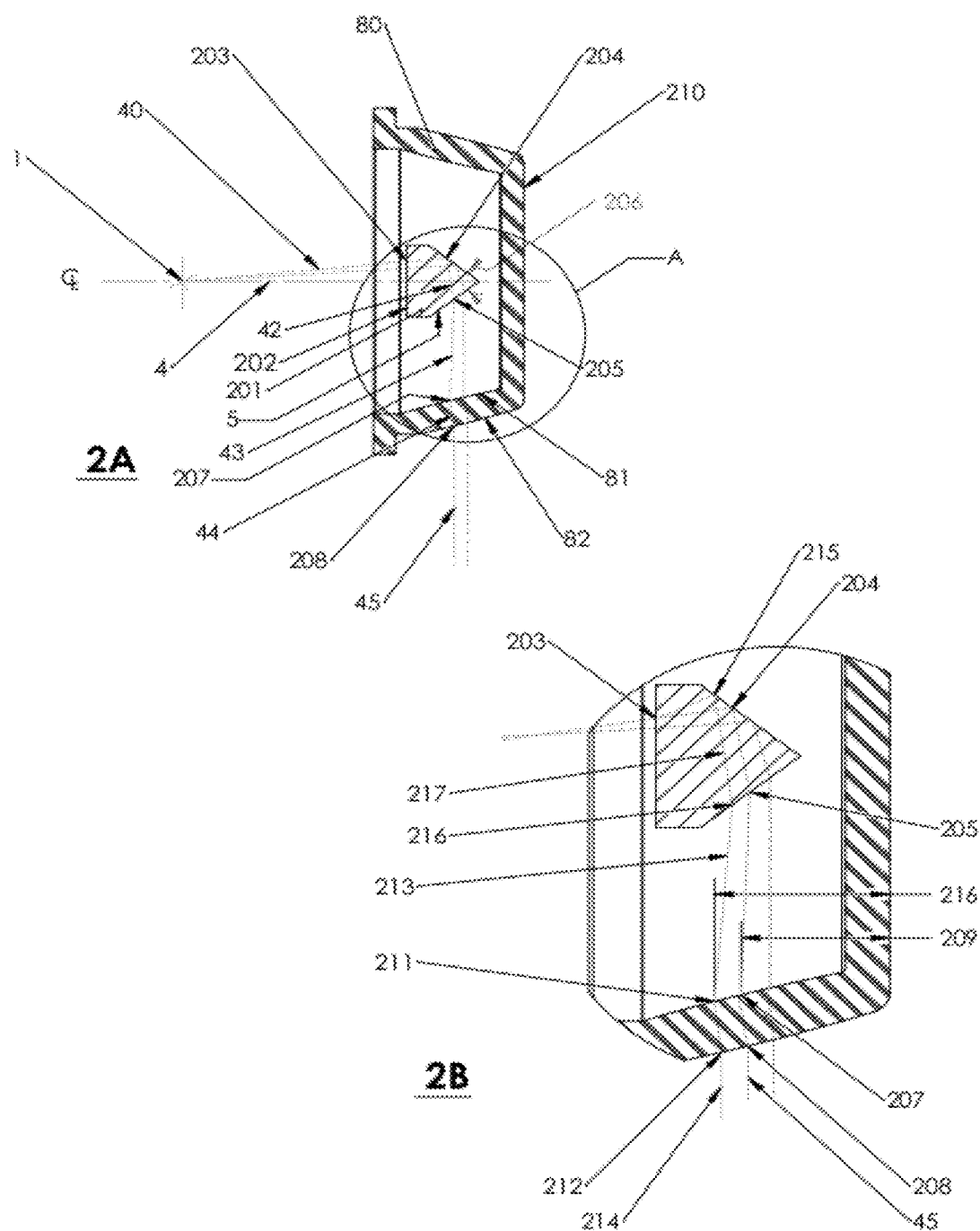
FIG. 2 is a diagrammatic cross-sectional view illustrating how, in the preferred embodiment, the convex cone lens of FIG. 1 and a ring lens can be utilized to generate a laser plane.

If the convex cone lens 101 of FIG. 1 is used without appropriate compensation, the resulting planar projection, as discussed above, is susceptible to temperature variations commonly experienced in the construction field. Over long distances, small variations in temperature may result in unacceptable deviations of the reference plane. To compensate for the temperature dependence of the laser projection, a ring lens 80 as shown in FIG. 2 is utilized. The geometric axis of rotation of the ring lens is coincident with the optical axis 4 of the cone lens 201.

Note that FIG. 2 also illustrates a variation of the invention in which the divergent incident beam 40 is received by the cone lens directly from the laser source 1 without the collimation shown in FIG. 1. In this more complicated case, the incident beam 40 undergoes two pronounced refractions—that is, initially at a point 203 on the base surface 202 of the cone lens 201 and subsequently at a point 205 on the lateral surface 5 of the cone lens (after total internal reflection at point 204 on the lateral surface). Deviations of the laser projection from the desired plane due to temperature variations is governed by the thermoptic coefficient of the cone lens material, as discussed above.

If the dispersed ray 43 is received by the interior surface 81 of ring lens at a point 207 a certain distance 209 from the outer areola 210, then the entire beam consisting of the totality of dispersed rays will form an continuous ring that is the locus of points on the interior surface 81 at the same distance 209 from the outer areola 210. The curvatures of the interior 81 and exterior 82 surfaces of the ring lens and index of refraction of the ring lens material are such that, at temperature $T_0$, after two refractions at points 207 and 208 of the aforementioned dispersed ring, the normalized projected beam 45 is both omnidirectional and orthogonal to the optical axis 4. Note that the ring lens curvature generated from the surface of revolution may have an outer areola 210 (as shown in FIG. 2) that is opened or closed, depending on the manufacturing process. A closed outer areola may eliminate injection molding artifacts while an opened outer areola may be more compatible with a diamond-turned process.

At a different temperature $T_0+\Delta T$, due to a change in the index of refraction of the cone lens, the incident ray 40 entering through the base of the cone lens at the same point 203 will be redirected by total internal reflection at a different point 215 on the lateral surface, then transmitted through the lens body along a deflected path 217, and finally emitted from the lens at a different location 216 on the lateral surface. Therefore, at $T_0+\Delta T$, the deflected dispersed ring 213 will be received by the interior face 81 of the ring lens at a different location 211. The ring lens curvatures, which also accounts for the temperature dependence of the refractive index of the ring lens material itself, will provide the necessary compensation at $T_0+\Delta T$ so that the normalized projected beam 214, resulting from refractions at different points 211 and 212 along the interior and exterior surfaces, will remain orthogonal to the optical axis 4. It should be understood that the diagrammatic illustration of ray paths in FIG. 2 is highly exaggerated for clarity. In actuality, the displacement of the dispersed beam that is received by the interior surface of the ring lens (from location 207 to 211 as temperature changes from $T_0$ and $T_0+\Delta T$), as measured by the difference between dimensions 216 and 209, has a negligible effect on the positional or planar accuracy of the reference projection.

The curvatures of the ring lens are modeled and extrapolated from point-wise solutions for compensatory gradients adapted for specific angles of incidence of the beam dispersed by the cone lens at different temperatures. Each location along the effective length of the optical surface of the ring lens corresponds to the path of the dispersed beam at a certain temperature and serves to normalize the dispersed beam at that temperature. Within reach of those skilled in the art are numerical as well as analytical methods for integrating over point-wise solutions to arrive at a complete curvature. Therefore, the effective length of the optical surface of the ring lens spans the operable temperature range (and the calibration tolerances) of the apparatus. Unlike prior art, the ring lens functions as a compensatory element with an optical surface only a portion of which is utilized at any given time. Since the ring lens is a compensatory element that self-reflexively compensates for its own temperature dependence, the curvature also accounts for the thermoptic properties of the ring lens itself.

Calibration of the disclosed projection apparatus involves alignment of the ring lens 80 with respect to the convex cone lens 201 so that the projected beam 45 at a certain temperature $T_0$ in the operable temperature range (or the projected beam 214 at a different temperature $T_0+\Delta T$) is normalized to be orthogonal to the optical axis 4. This may be accomplished by translating the ring lens with respect to a fixed cone lens along the optical axis. When planarity (and also orthogonality, by design) of the resulting projection is achieved, the ring lens is secured into position. Alternatively, the cone lens can be translated with respect to a fixed ring lens along the optical axis 4. The laser source and untranslated optical components, fixed and aligned during the assembly operation of the manufacturing process, provide the datum which is the basis for post-assembly calibration.

Figure 3:
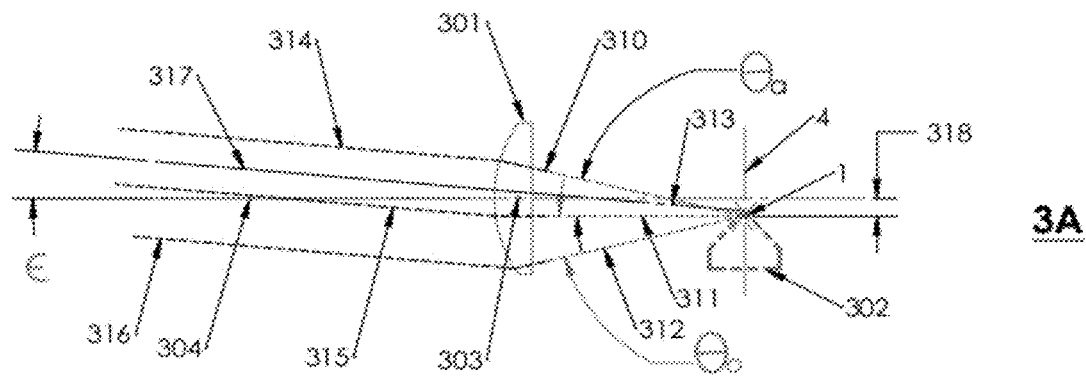
FIGS. 3A, 3B, and 3C are "thin-lens" model diagrams of the ring lens in FIG. 2 illustrating the calibration process to normalize and athermalize the projection of dispersed rays from various types of cone lenses or equivalents thereof.
Figure 3:
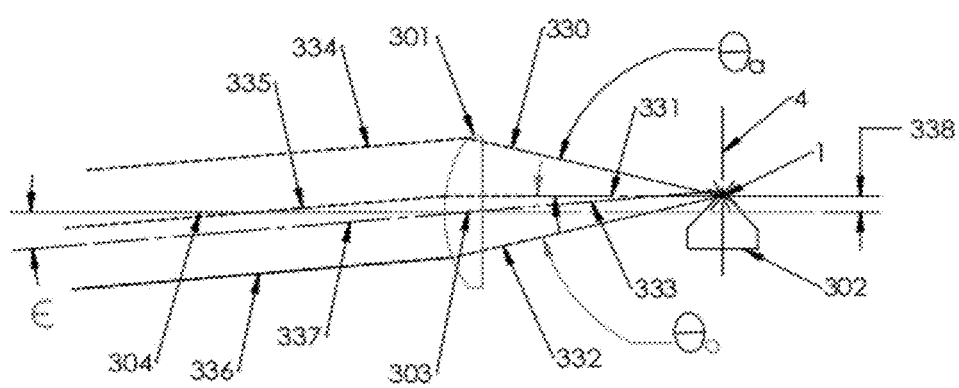
Figure 3:
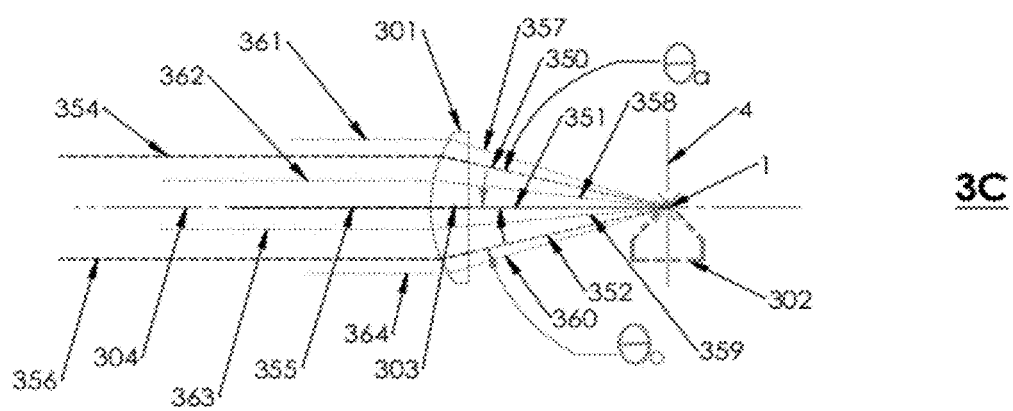

To illustrate the calibration process are FIGS. 3A, 3B, and 3C depicting a partial cross-sectional "thin-lens" model of the ring lens. The calibration process will effectively translate the ring lens or, in the case of the foregoing drawings, the "thin-lens" model of the ring lens 301 to normalize the beam dispersed by the cone lens 302. As discussed in the previous section, cone lenses may be understood as "normal," "acute," or "obtuse" depending on the angle of the dispersed beam at a nominal or midpoint temperature $T_0$. Assume an acute cone lens 302 is illustrated in FIG. 3A. The corresponding dispersed beam 310 with an angle of incidence $\theta_a$ is projected by the ring lens at a deflected angle $\theta_a-\epsilon$. Since the ring lens is not aligned, the resulting under-compensated projection 314 is not orthogonal with respect to the optical axis 4 of the cone lens. With the extent and direction of the misalignment 318 changing to that shown 338 in FIG. 3B, the corresponding dispersed beam 330 with an angle of incidence $\theta_a$ is projected by the ring lens at a deflected angle $\theta_a+\epsilon$. The over-compensated projection 314 is also not orthogonal with respect to the optical axis 4 of the cone lens. However, when the ring lens is properly aligned, as shown in FIG. 3C, the dispersed beam 350 will be normalized so that the resulting projection is orthogonal.

Similarly, if an obtuse cone lens is assumed for FIGS. 3A, 3B, and 3C, the resulting under-compensated projection 316 at angle $\theta_o-\epsilon$, over-compensated projection 336 at angle $\theta_o+\epsilon$, and normalized projection 352 of the respective incident (at angle $\theta_o$) rays 312, 332, and 352 dispersed by the cone lens also illustrate the same principle of operation. The calibration operation involves aligning the ring lens so that the resulting projection is orthogonal to the optical axis 4 of the cone lens. For the sake of completeness, it should also be appreciated that the case of the normal cone lens is similarly illustrated by FIGS. 3A, 3B, and 3C with the under-compensated projection 315, over-compensated projection 335, and normalized projection 355 of the respective incident rays 311, 331, and 351 dispersed by the cone lens.

Note that the optical axis 4 of the cone lens 302 in FIGS. 3A, 3B, and 3C corresponds to the actual geometric axis of rotation and the optical axis 4 of the cone lens shown in FIG. 1 and FIG. 2. The optical axis 304 of the "thin-lens" model is an abstraction of what in actuality is a plurality of points approximately mid-plane (defined as the plane which symmetrically intersects a torus such that the intersection results in concentric circles) of the actual toroidal ring lens where axial rays parallel to that plane will focus. The mapping to an idealized focal point 1 of the rays dispersed by the cone lens throughout an operable temperature range results in a more complex ring lens curvature that is based on the tracing of tangential axial rays along the clear aperture of the simple lens required at each temperature for normalization. Hence, for a calibrated ring lens that is aligned with respect to the cone lens at a certain temperature in the operable temperature range, any temperature-dependent deviation of the dispersed beam is also normalized. If FIG. 3C illustrates a normal cone lens with a corresponding dispersed ray 351 at temperature $T_0$, the resulting normalized projection 355 will be orthogonal since the ring lens is properly aligned. At some greater temperature $T_0+\Delta T$ the deviation of the dispersed ray 358 will be governed by the thermoptic coefficient of the cone lens material. However, the resulting projection 362 at temperature $T_0+\Delta T$ will remain orthogonal. Similarly, for a properly aligned ring lens, at a different temperature $T_0-\Delta T$, the resulting projection 363 will also be orthogonal. Note that deviations of the dispersed ray due to changes in temperature, as shown in FIG. 3C, are highly exaggerated for diagrammatic clarity.

The athermalization of the projection planarity by the ring lens is realized by the precise curvatures of the optical surfaces which are adapted to guarantee that all deviations of the dispersed beam within an operable temperature range are mapped, as it were, to the same focal point. From this focal point all divergent rays that propagate through the ring lens will be parallel to one another and orthogonal to the optical axis 4. Therefore, a calibrated and properly aligned ring lens depicted in FIG. 3C will also compensate for beams dispersed by acute and obtuse cone lenses from the same focal or emission point 1. For example, if FIG. 3C illustrates an obtuse cone lens with corresponding dispersed rays 352, 359, and 360 at temperatures $T_0$, $T_0+\Delta T$, and $T_0-\Delta T$, respectively, then the corresponding resulting projections 356, 363, and 364 will be substantially orthogonal regardless of temperature variations within the operable range. Similarly, if an acute cone lens is assumed for FIG. 3C with dispersed rays 350, 357, and 358 corresponding to temperatures, $T_0$, $T_0+\Delta T$, and $T_0-\Delta T$, respectively, the properly aligned ring lens will normalize the corresponding resulting projections 354, 363, and 362 to be orthogonal to the optical axis 4.

Therefore, divergent beams emitted from a point on the focal plane will be projected in the same parallel direction which, in the case of a calibrated ring lens, is orthogonal to the optical axis of the cone lens. This optical property provides for the possibility of normalizing and athermalizing the dispersed beam. Thus, the calibrated or properly aligned ring lens shown in FIG. 3C is, in fact, a special case or application of the larger implication that the direction of any ray, emitted from a point 1 on the focal plane 4, passing through the principal point 303 of the ring lens will be undeflected. This undeflected direction is, in fact, the projective direction of all divergent rays emitted from that focal point. This fact is illustrated by FIGS. 3A and 3B in which the projected rays (such as 314 and 315 for FIG. 3A and 335 and 336 for FIG. 3B) are parallel to the undeflected ray (317 for FIG. 3A and 337 for FIG. 3B) transmitted through the principal point 303 of the lens.

Progressing from special cases to more generalized conceptions, from simple idealizations to more complicated actuality, additional explanatory remarks are now apposite. It should be understood that the ambiguous term "correction" (i.e., under-correction or over-correction) is used above to refer to the normalization and athermalization of the dispersed beam as compensated by the ring lens rather than to the actual focusing characteristics of a simple lens which inevitably has optical aberrations. Imperfect real lenses may have spherical aberrations or suffer from optical coma, but since the disclosed projection apparatus utilizes monochromatic lasers sources, aspherical curvatures can be employed to greatly reduce spherical aberrations and coma. Nevertheless, manufacturing tolerances result in inexorcisable imperfections of the lens which, in this application, translates to a merit function or a design trade-off between the correction for planarity and the correction for focus. As discussed above, the projection planarity (and orthogonality, by design) is of primary importance, even at the risk of a degradation in focus, within reasonable limits. Such reasonableness necessarily depends on the accuracy requirements of the reference projection.

It should also be noted that the idealized focal point of the thin lens shown in FIGS. 3A, 3B, and 3C coincides with the apex of the cone lens. However, in actuality, for a ring lens that is properly aligned with respect to the cone lens, the "focal point" or, more accurately, the plurality of "focal points" of the ring lens consists of a thin annular "focal ring" that symmetrically circumscribes the geometric axis of revolution of the ring lens and is defined by the focus or convergence of rays omnidirectionally crossing the axis. The plurality of focal points is a direct result of design rather than a second-order consequence of optical aberrations because the dispersed beam is emitted not as a point source at apex of the cone lens, as shown in the idealized diagrams, but as a "region source," as it were, or from a region within an aperture along the lateral surface of the cone lens, as shown in FIG. 2. In other words, to introduce more reality into the idealized diagrams, it should be understood that it is the "apparent" focal point of the ring lens that would be properly located on the optical axis of the cone lens during calibration. In this sense, if properly aligned, the ring lens remains focused throughout an operable temperature range and accounts for the change in the location of the "region source" of the dispersed beam emitted from the cone lens as temperature varies.

1.3 Path-Compression Prism Assembly

The disclosed projection apparatus, like other compact and portable optical systems, is constrained by size requirements. Various means of compressing the beam path exist for integrating optical components with focal lengths exceeding the limits of the design envelope. For example, single-piece Delta Prisms, with a path-compression ratio of approximately 1.2:1, are often used in compact binoculars while two-piece Pechan Prisms achieve a higher path-compression ratio of approximately 2.3:1. However, for the disclosed projection apparatus, various considerations and design constraints (such as the relatively long focal length of the ring lens) impose a path-compression ratio requirement that is double of what can be obtained by Pechan prisms, or approximately a five-fold compression in path length.

Figure 15:
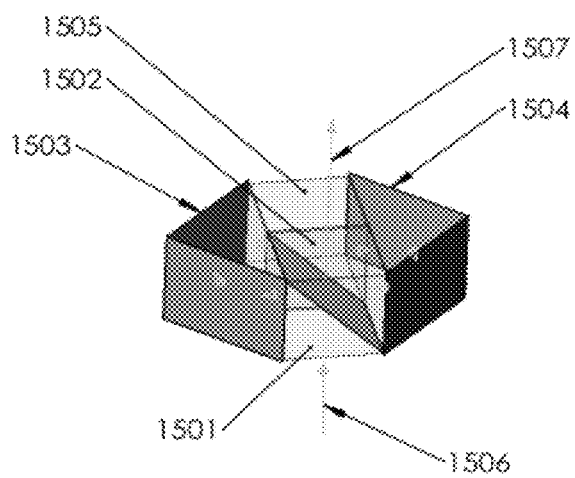
FIGS. 15A and 15B illustrate, respectively, a perspective and an exploded view of the path-compression prism assembly, showing propagation of an incident ray through the various optical elements.
Figure 15:
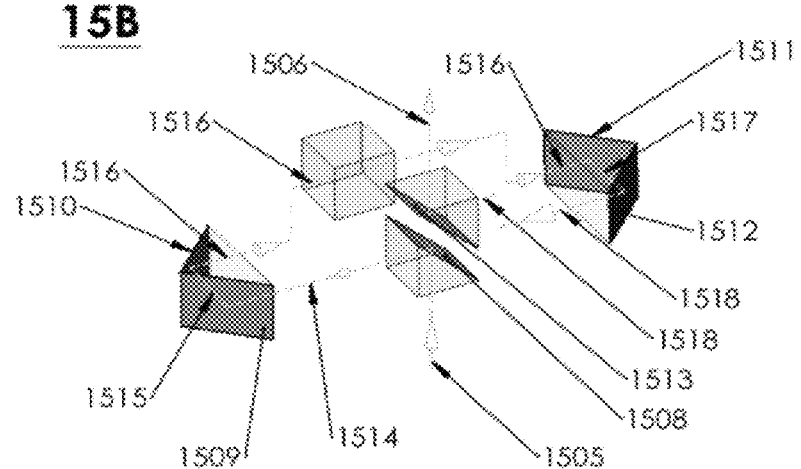

The invention disclosed in this section is a path-compression prism assembly that allows for a compactness in the design of the projection apparatus which is used as a portable construction tool. Shown in FIG. 15B is an exploded view of a path-compression prism assembly, illustrated as a monolithic assembly in FIG. 15A, which can be positioned "in-line" along the optical axis between a laser source and the cone lens. In addition to compressing the path length of the incident beam, effectively lengthening the optical distance between the ring lens and the laser source, the prism assembly also allows the divergent laser beam to expand into the clear aperture of the cone lens, thereby diminishing the deleterious effects of the conical apex region, as discussed above.

The specific embodiment of the path-compression prism assembly, as shown in FIG. 15B, comprises of readily-available optical elements that are joined together to function as a fixed-length, monolithic assembly. If the light-propagating material of the optical elements were glass, the path-compression ratio would be approximately 4.7:1. A higher ratio of approximately 6.3:1 can be achieved by a non-monolithic embodiment which utilizes mirrors (in place of the Porro prisms 1503 and 1504 or the right-angle prisms 1501 and 1502, as shown in FIG. 15B) to allow for variable path lengths by adjusting the distances between reflective faces. The adjustability of a non-monolithic assembly can also provide a convenient means to focus the optics (by adjusting path length) in ruggedized systems that are inaccessibly sealed from harsh environments or to provide the responsive variability required in optical assemblies in which high-inertia optical elements may preclude such dynamics.

Unlike a Delta or Pechan prism in which the transmitted beam remains within a single plane, the invention teaches a compression plane that is orthogonal to the direction of incidence 1505 and emission 1506. Two reflective faces deflect the incident beam into and out of the path-compression plane defined by the closed circuitous path of the reflected beam. As shown, the incident ray 1505 is reflected by the face 1508 of the right-angle prism 1501 into a compression path consisting of the following segments: ray 1514 is reflected by the first reflective face 1509 of the first Porro Prism 1503, ray 1515 is reflected by the second face 1510 of the first Porro prism 1503, ray 1516 is transmitted through the transparent block 1505 and is reflected by the first face 1511 of the second Porro prism 1504, ray 1517 is reflected by the second face 1512 of the second Porro prism 1504, and finally ray 1518 is reflected by the face 1513 of the second right-angle prism 1502 resulting in a direction of emission direction 1506 that coincides with the direction of incidence 1505.

Additional remarks below further clarify the scope and technical advantages of the inventive concept disclosed in this section. The transparent block 1505 serves not only to provide a structural solidity to the assembly but also to reduce the optical transmission inefficiencies resulting from glass-air interfaces. Although not essential to the path-compression functionality of the prism assembly, the transparent block may be required as a matter of engineering practicality. The reflective faces that redirect the beam within the path-compression plane may also be practically configured by four right-angle prisms. Note moreover that since the right-angle blocks 1501 and 1502 can be joined with an index-matched optical adhesive, a reflective coating on the face of a single right-angle block is sufficient if both sides of the coating are reflective. Note further that reflectivity may also be obtained by total internal reflection.

The prism assembly is also easily scalable to accommodate longer path lengths with or without changing the clear aperture diameter. The path length and clear aperture diameter may be increased by scaling the dimensions of the optical elements to increase the size of the optical surfaces or by stacking a plurality of prism assemblies (not necessarily of the same size) so that the emitted beam 1506 from one assembly is received as the incident beam 1505 of another assembly. By increasing the path-compression ratio, the path length is increased without increasing the clear aperture diameter. This may be accomplished by increasing the distance between the reflective surfaces of the right-angle prisms 1501 and 1502 and of the Porro prisms 1503 and 1504 or the distance between the reflective surfaces of the Porro prisms themselves or the equivalent thereof.

1.4 Non-Optical Components

The preferred embodiment of an apparatus for generating laser reference planes also includes specific configurations and components, to be described below, that are adapted for use in the construction field.

Figure 9:
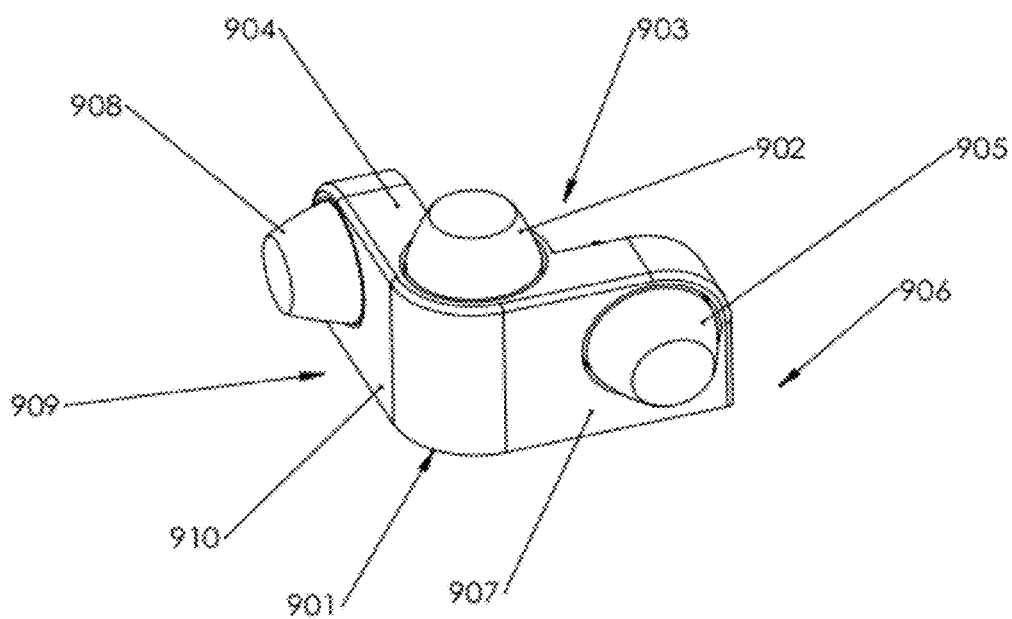
FIG. 9 illustrates an assembly of three sets of plane-generating optics utilized in the preferred embodiment to generate three omnidirectional and mutually-orthogonal projection planes.

First, visual references derived from three-dimensional Cartesian planes have proven useful in construction projects. These mutually-orthogonal references serve as horizontal and vertical markers that can be used for alignment and measurement. The laser references are projected onto incident surfaces which may be the walls or ceiling of an interior space. The disclosed projection apparatus adapted for this application includes three sets of omnidirectional plane-generating optics arranged in mutually-orthogonal orientations, as shown in FIG. 9. Depicted is a base assembly 901 with orthogonal faces 907, 910, and 904 that serve, respectively, as a rigid supporting structure for the X-axis optics 905, the Y-axis optics 908, and the Z-axis optics 902 that generate their corresponding omnidirectional reference YZ-plane 906, XY-plane 909, and XY-plane 903. The location of the Cartesian origin or the point of intersection of the three planar projections is external to the base assembly.

Second, any supporting structure used to stabilize, align, and position the apparatus should not obstruct any portion of the omnidirectional projections. Shown in FIGS. 10A, 10B, 10C, and 10D are various views of an extendible or telescopic tripod structure (in its shortened state) adapted to the disclosed projection apparatus. Unlike the equally-pivotable legs of a typical tripod, one leg 1101 is constrained to be extendible only in the vertical orientation to preclude obscuring the laser reference planes 1104 projected from the apparatus 1003. The projection apparatus is secured to the platform 1107 by standard tripod screws, threaded or unthreaded fasteners, pins, keyed or latching mechanisms, or other effective means for securing the apparatus. The other two legs 1102, pivotable and equipped with weighted feet 1006, are adjusted and extended, in concert with any reinforcing structure, so that the combined center of gravity 1105 is located at a sufficiently stable point within the pyramidal space bounded by the three legs of the tripod. The weighted foot of each pivotable leg, consisting of a simple dead weight or may include system accessories such as backup batteries, is equipped with a pivotable joint (such as a ball-and-socket) so that a desired orientation of the foot can be maintained regardless of how the legs are adjusted. To prevent occlusion of the laser projections, the range of adjustability of the tripod is constrained to be within a quadrant delineated by the intersection of the planar projections 1004, as shown in the top view of FIG. 10C.

Figure 10:
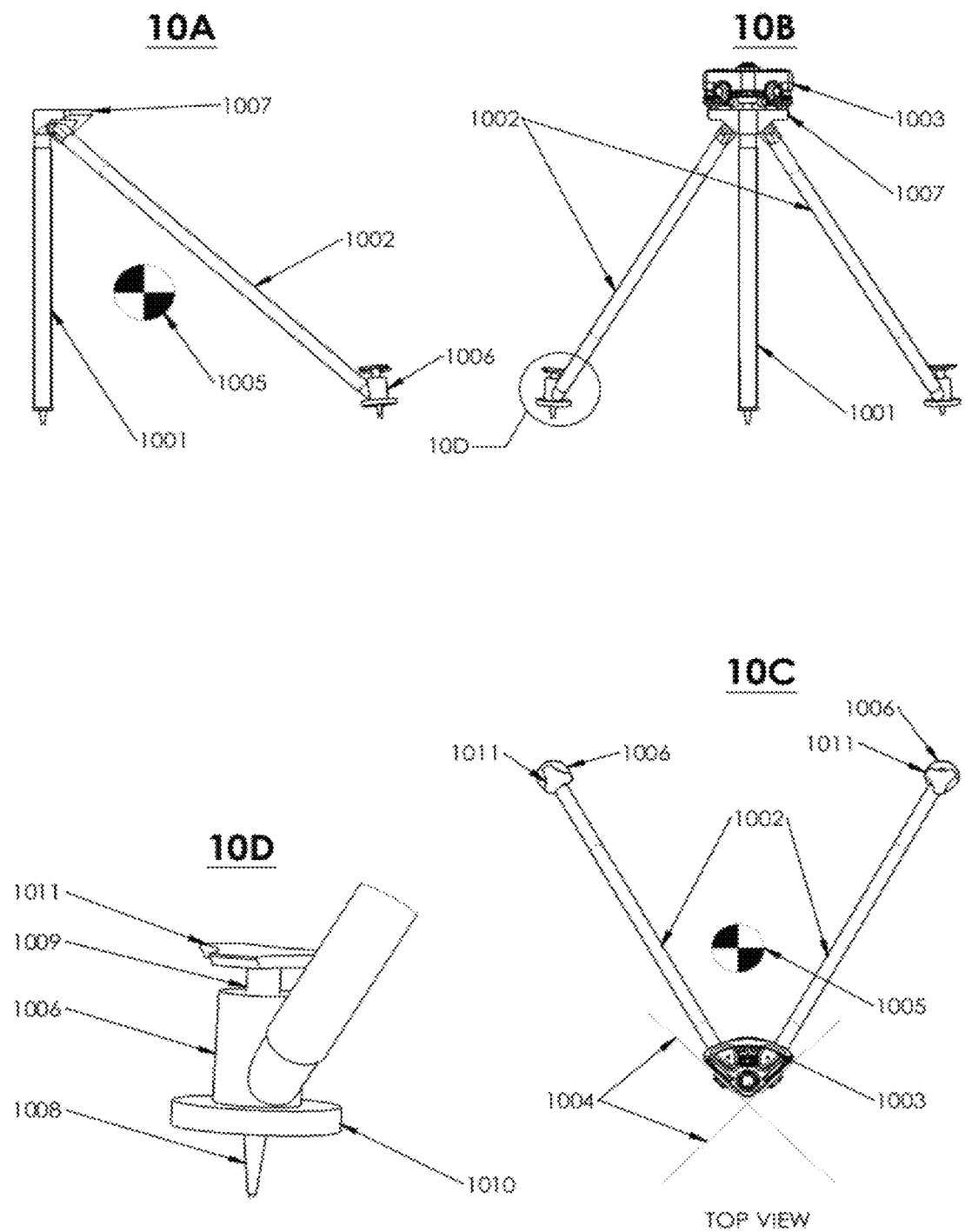
FIGS. 10A, 10B, 10C, and 10D illustrate, respectively, the side, front, top, and detailed views of an extendible tripod support structure adapted for mounting, aligning, and stabilizing the projection assembly of FIG. 9.
Figure 11:
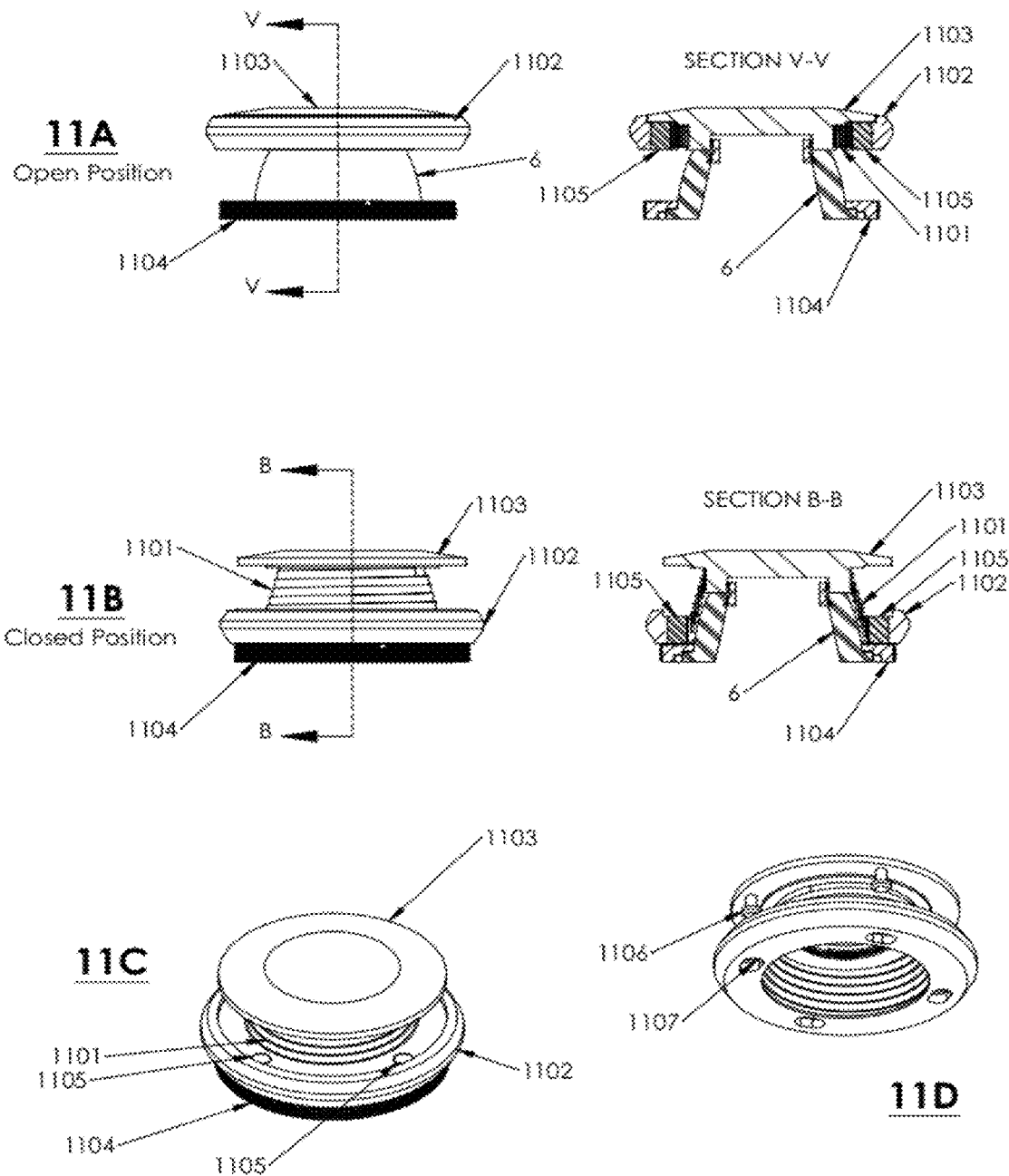
FIGS. 11A, 11B, 11C, and 11D illustrate, respectively, the cross-sectional views of the volute-spring lens-shield embodiment in the open and closed positions, and the perspective views of the volute-spring lens-shield embodiment in the closed and open positions.
Figure 12:
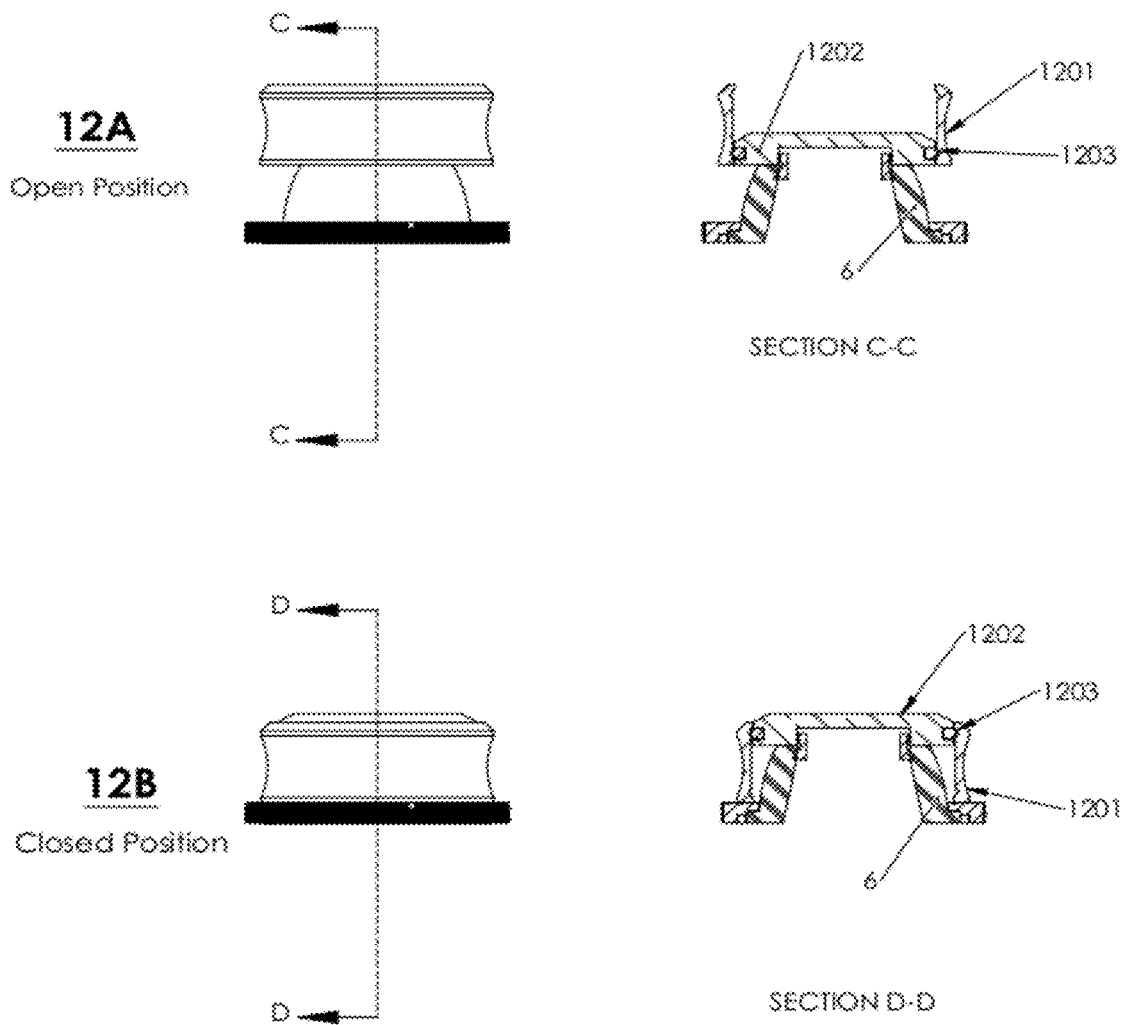
FIGS. 12A and 12B illustrate, respectively, the cross-sectional views of the sliding-barrel lens-shield embodiment in the open and closed positions.
Figure 13:
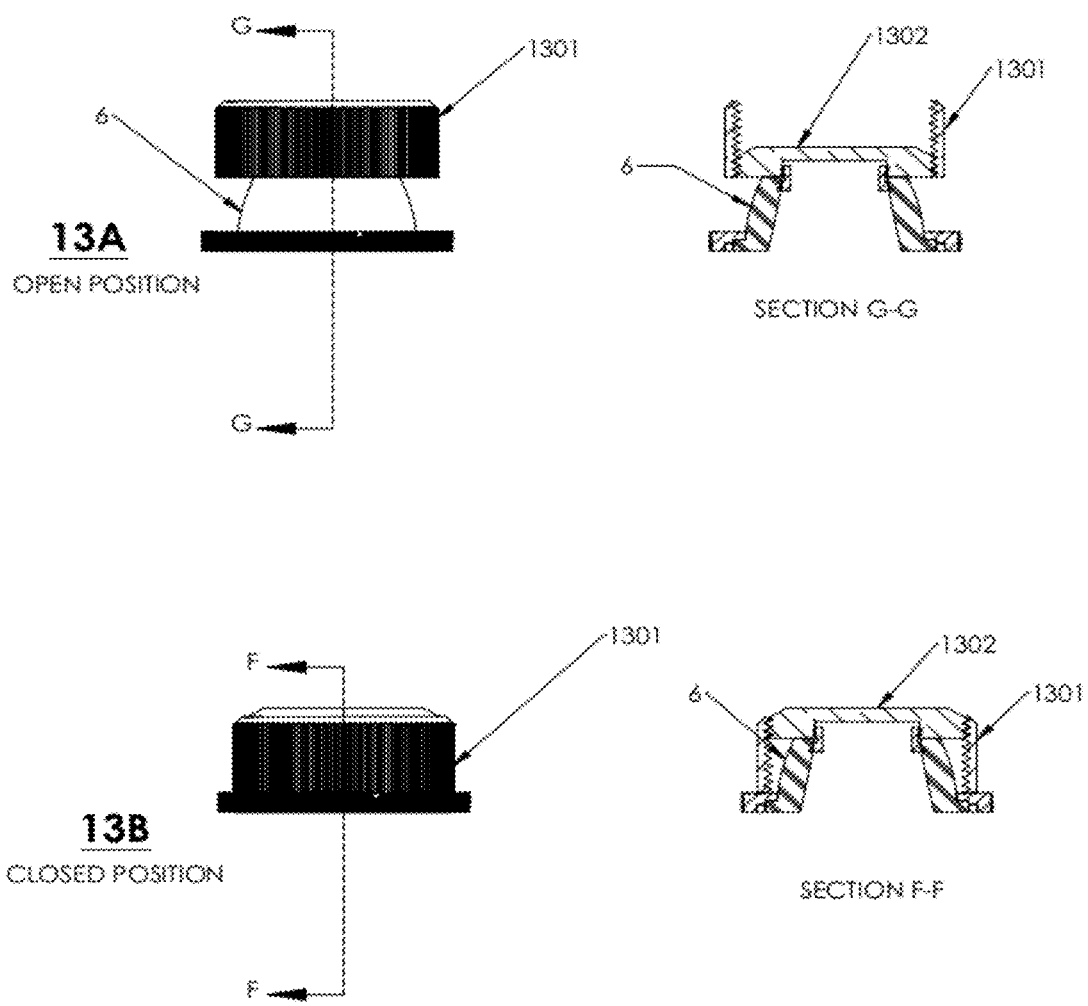
FIGS. 13A and 13B illustrate, respectively, the cross-sectional views of the threaded-barrel lens-shield embodiment in the open and closed positions.
Figure 14:
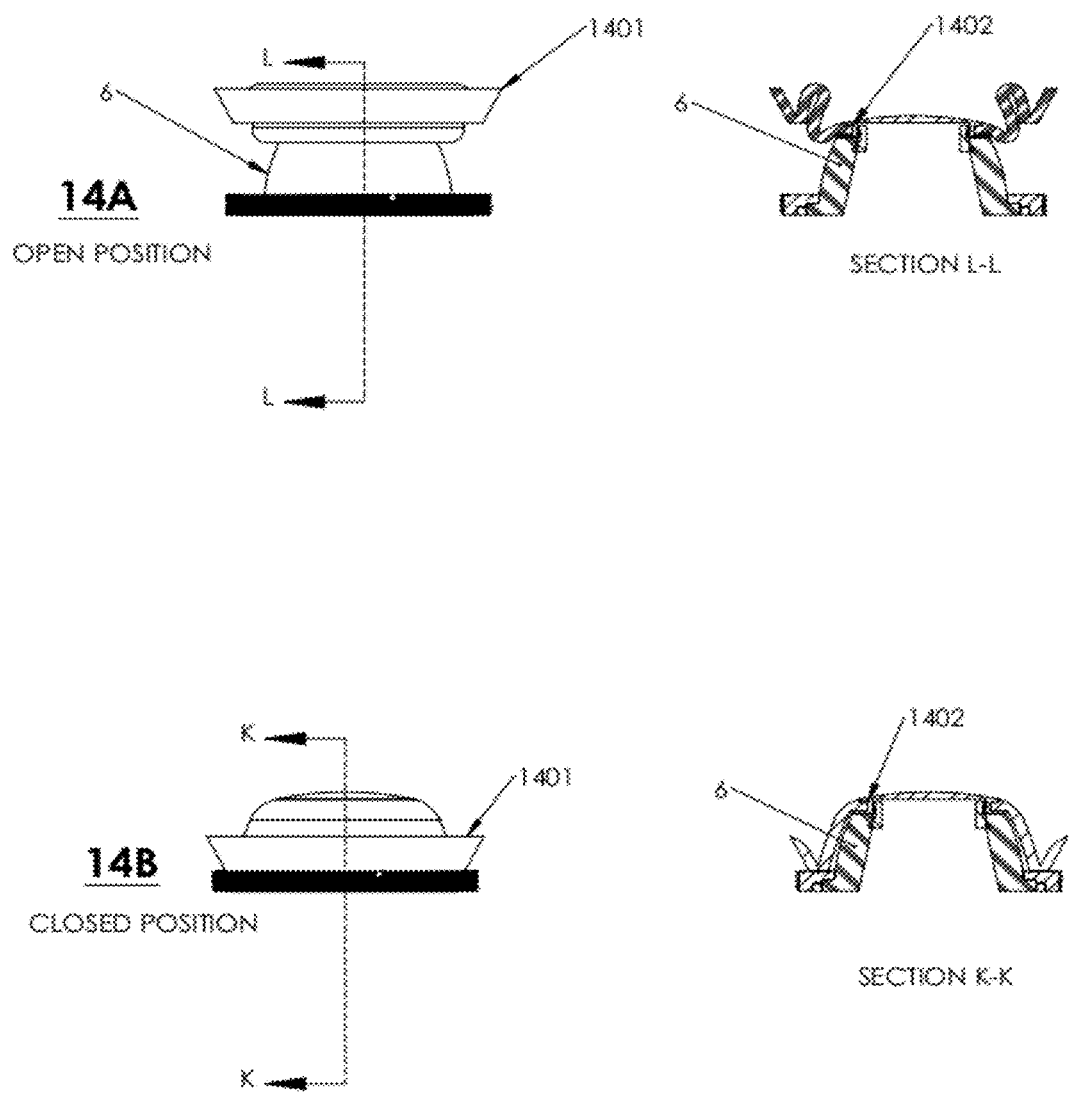
FIGS. 14A and 14B illustrate, respectively, the cross-sectional views of the elastomer lens-shield embodiment in the open and closed positions.

The weighted foot for each of the pivotable legs 1002 is depicted in greater detail in FIG. 10D. Illustrated is an embodiment which utilizes an anchoring stake which is embedded in the ground to provide additional stability. The stake head 1011, adapted for use with a mallet or one's foot, is coupled to the stake anchor 1008 by a shaft 1009 that extends through the weighted foot 1006 and a stake pad flange 1010. When the stake anchor is completely driven into the ground, the pad flange, with its diameter substantially larger than that of the legs, would rest on the surface to provide additional stability against lateral forces and moments. Alternatively, the straight stake anchor 1008 could be replaced by a screw-like variation that could be twisted or screwed into the ground with a well-adapted stake head 1011. With the adjustable legs of the tripod providing sufficient degrees of freedom, with the weighted feet providing adequate counterbalance, and with the various embodiments of an anchoring stake concept providing additional stability, the apparatus may be securely positioned and aligned on non-flat terrain.

Third, even with the stability of a well-adapted support structure such as the tripod disclosed above, the projection apparatus is still vulnerable to occasional mishaps in the rugged environment of the construction field, as well as general contamination by dust and moisture. Since the precision optics are vulnerably exposed, damage resulting from accidental drops or impact can be reduced or prevented by utilizing a protective shield for each plane-generating optical assembly. During operation, the lens shield is manually opened to a folded or retracted position to allow unobstructed projection of a reference plane. During transport of the portable apparatus or during storage, the lens shield can be manually unfolded or extended to fully enclose the optics, forming a protective covering. Therefore, the lens shield, unlike an immovable case or a "light-house structure" (as described in U.S. Pat. No. 4,662,707), does not alter the optical characteristics of the apparatus and does not require additional compensation to achieve orthogonality and athermalization of the planar projection.

Shown in FIGS. 11, 12, 13, and 14 are, respectively, the spring-type, threaded-barrel, sliding-barrel, and elastomer embodiments. For each variation, the lens shield may be secured to the ring lens by a cylindrical and concentric interface component or hub that is adapted for the particular requirements of the specific lens shield embodiment.

The spring-type embodiment of the lens shield, as shown in FIGS. 11A, 11B, 11C and 11D, utilizes a compression or tension volute-spring mechanism 1101 secured to the ring lens 6 via a concentric hub component 1103. A compression lens shield would be compressed to an open position, as shown in FIG. 11A, and relaxed to its normally-closed position, as shown in FIG. 11B. A tension lens shield would be stretched to a closed position, as shown in FIG. 11B, and relaxed to its normally-open position, as shown in FIG. 11A. A means of latching or securing the lens shield in its non-relaxed state can be implemented by a magnetic, electromagnetic, pressure-based, bayonet-type, hinged, threaded, or deformable mechanism. The normally-closed alternative would provide a more fail-safe protection in the event the latching mechanism malfunctions. However, both alternatives enhance the ruggedness of the apparatus with coils that contiguously form a continuous shielding surface (as shown in FIG. 11C) to protect the optics from any impact forces otherwise transferred.

The latching mechanism or a portion thereof may be included in the rim 1102 which is fixed to and moves along with the lens shield. A mating mechanism may be incorporated in the hub component for the normally-closed compression lens-shield embodiment or may be located at the base of the lens-shield assembly for the normally-open tension lens-shield embodiment. The former case, as illustrated in the section view of FIG. 11A, utilizes a magnet 1105 that is embedded in the rim 1102. When the lens shield 1101 is compressed to its open position, the magnetic rim comes into contact with a ferrous hub 1103 and is held in position by magnetic force. The latter case, as illustrated in the section view of FIG. 11B, also utilizes a magnet 1105 embedded in the rim 1102 which comes into contact with a ferrous ring-lens retainer 1104 when the lens shield 1101 is stretched to its closed position. Alternatively, for the latter case of a normally-open embodiment, a hook-type latching mechanism can be used to secure the lens shield in a closed position. Illustrated in FIG. 11D are latch hooks 1106 which are guided into and engages with the catchments 1107 as the lens shield is stretched to its closed position, as shown in FIG. 11C. Note that the lens shield and its constituent elements (volute-spring 1101, hub 1103, rim 1102, and latching means) may be distinct parts, as illustrated, or may be fashioned as a single-piece component.

The sliding-barrel embodiment of the lens shield, as shown in FIGS. 12A and 12B, employs a cylindrical sleeve or barrel that is capable of being manually translated to a closed or an open position along a concentric hub 1202 attached to the ring lens 6. An O-ring 1203 is used as part of the interface between the hub and the barrel not just as a protective seal but also as a means of securing the barrel in the open position, as shown in FIG. 12A, and the closed position, as shown in FIG. 12B. The O-ring is received by a circumferential groove in the interior surface of the barrel, corresponding to the each position of the barrel. The groove corresponding to the open position may be shallower than that corresponding to the closed position so that the lens shield in the open position has a lower disengagement threshold compared to that of the closed position, with the desired result that the lens shield closes more easily upon impact.

The threaded-barrel embodiment of the lens shield, as shown in FIGS. 13A and 13B, is similar to the sliding-barrel variation except for the fact that an adjustment requires a rotation rather than a translation. The threaded barrel 1301 meshes with a threaded hub 1302 which is secured to and concentric with the ring lens 6. The barrel is manually rotated to an open position shown in FIG. 13A or to a closed position shown in FIG. 13B. Depending on the coarseness of thread pitch, a latching mechanism may not be required and the disengaging protective back-drive in the sliding-barrel design may be usefully applicable in this embodiment.

The elastomer embodiment of the lens shield, as shown in FIGS. 14A and 14B, utilizes a flexible elastomer lens shield 1401 that is bonded to the hub 1402 which in turn is secured to and concentric with the ring lens 6. The elastomer lens shield is designed for bistable deformations such that it can be manually unfolded, as shown in FIG. 14B, to completely enclose the optics or manually folded, as shown in FIG. 14A, during operation of the apparatus. Because of inherent bi-stability of the elastomer lens shield due to the specific variations in thickness, elasticity, and curvature of the molded material, a latching mechanism is not necessary for maintaining the lens shield in its folded and unfolded state.

2. Alternate Optical Embodiments

An optical component in the projection apparatus may be considered as a means for dispersing the incident beam or as a means for normalizing the dispersed beam. The inventive concepts of the normalizing ring lens and the two-step process of dispersal and normalization may be implemented by alternate optical embodiments discussed in this section. Despite the technical advantages of the preferred embodiment that utilizes the convex cone lens and the ring lens, other means for dispersal and normalization may better satisfy the specific requirements of particular applications. However, equally applicable to all embodiments is the observation that optical components used for normalization require less optical power if the dispersed beam is closer to being orthogonal to the direction of incidence. Also applicable is a calibration method, generalized from the approach discussed above, which involves the alignment of the relative positions of the optical components used for dispersal and normalization.

2.1 Axicon, Double-Prism Ring, and Ring Lens

Figure 4:
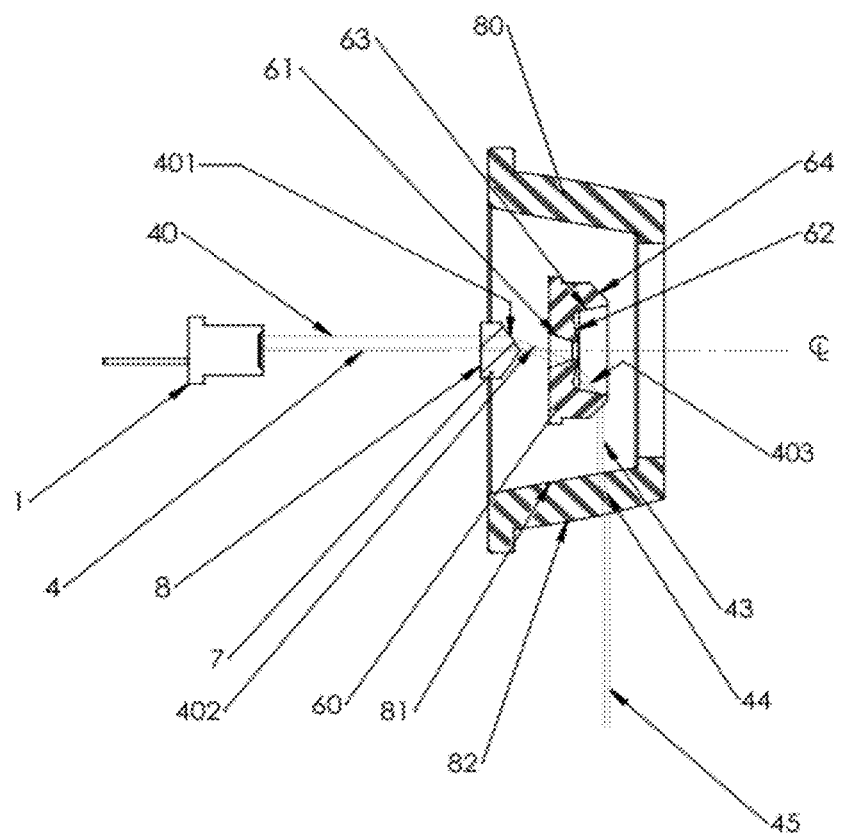
FIG. 4 is a diagrammatic cross-sectional view illustrating an alternate embodiment that utilizes a convex refractive cone lens (axicon), a double-prism ring, and a ring lens to generate laser planes.

In an alternate embodiment shown in FIG. 4, a typical refractive cone lens or axicon 7 and a coaxial double-prism ring 60 are employed to disperse the incident beam. Axicons are readily available and are manufactured as purely refractive optical elements without the property of total internal reflection exhibited by the convex cone lens 101 in FIG. 1. The lateral surface of the axicon refracts 401 and initially disperses 402 the incident ray 40 which is subsequently received by a second coaxial optical component, the double-prism ring 60, which further disperses the ray 43. Unlike the prior art related to prism-ring lenses, the double-prism ring comprises of a plurality of prisms designed to function in a compound or serial manner. Specifically, the emitted projection from one prism is received by another prism. This compounding effect is especially well-suited for achieving a wider dispersion of the incident beam.

Although any number of prisms may be utilized to satisfy the requirements of a particular application, a specific implementation is illustrated in FIG. 4 depicting an annular cross-ssection consisting of two prisms. The emitted ray 403 from the first prism (consisting of faces 61 and 62) is received by the second prism (consisting of faces 63 and 64). Thus, the double-prism ring functions as a series of dispersion prisms to refract the initially dispersed beam 402 over wider angles.

The resulting dispersed beam 43 is received by the interior surface 81 of the ring lens 80 and, as discussed above, is normalized by the precise curvatures of the ring lens so that the beam is emitted from the exterior surface 82 as an orthogonal planar projection 45. With appropriate surface curvatures, the faces of the prisms may also cooperate with the coaxial ring lens to normalize and athermalize the dispersed beam.

2.2 Axicon, Spherical Reflector, and Ring Lens

Figure 5:
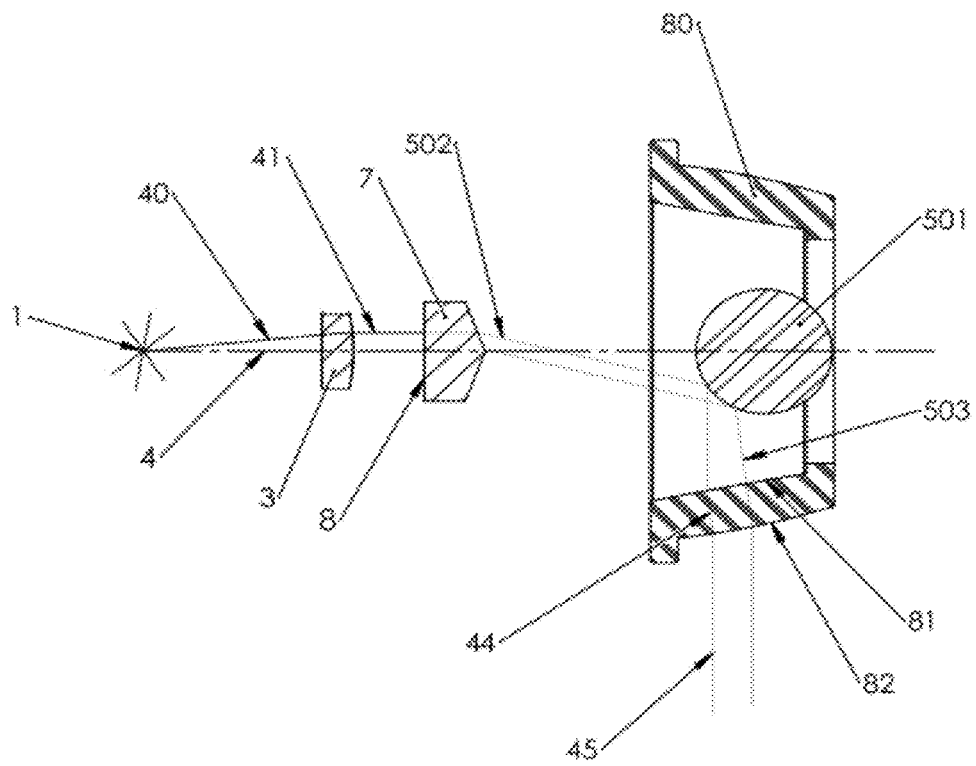
FIG. 5 is a diagrammatic cross-sectional view illustrating an alternate embodiment that utilizes a convex refractive cone lens (axicon), a spherical reflector, and a ring lens to generate laser planes.

The alternate embodiment shown in FIG. 5 utilizes an axicon 7 and a spherical reflector 501 to disperse the incident beam. The incident ray 41, after collimation by lens 3, is initially dispersed 502 by the axicon 7 and subsequently dispersed 503 by the surface of the spherical reflector 501, the center of which is located on the optical axis 4. The sphere may be a closed surface, as shown, or consist of a hemisphere, a closed or open spherical sector, or any portion of a spherical surface sufficient for the requirements of a particular application. The dispersed beam 503 is received by the coaxial ring lens 80 along its interior surface 81 and exits through the exterior surface 82 in a direction 45 that is orthogonal to the optical axis 4. As discussed above, the transmission of the dispersed beam through the ring lens also serves to athermalize the resulting reference projection so that the normalized beam remains orthogonal throughout an operable temperature range. As in the foregoing embodiments, the compensatory curvatures of the ring lens is defined by and accounts for the temperature-dependent optical properties of other distinct refractive elements including the axicon 7 and the collimating lens 3.

2.3 Concave Cone Lens and Ring Lens

Figure 6:
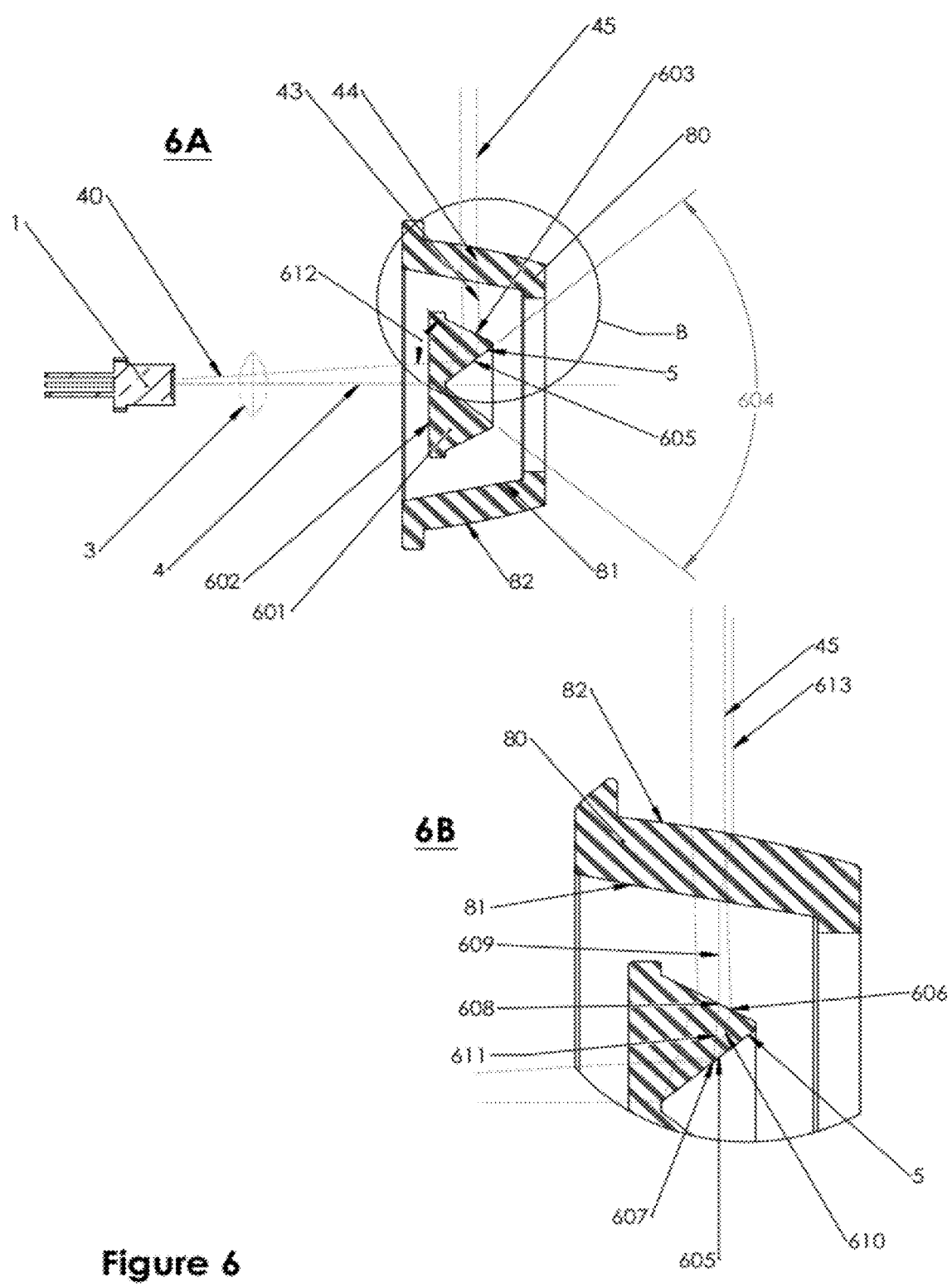
FIG. 6 is a diagrammatic cross-sectional view illustrating an alternate embodiment that utilizes concave cone lens and a ring lens to generate laser planes.

The alternate embodiment illustrated in FIG. 6 employs a configuration in which a ring lens 80 is coaxial with a concave cone lens 601. The incident beam 40, from laser source 1, is received by the concave cone lens at the base surface 602 and is reflected by the lateral surface 5 of the conical concavity. The base surface 602 may include a beam-shaping curvature to focus or collimate the beam received directly from the laser source. The lateral surface 5 may be coated with reflective material to redirect the incident beam. Alternatively, as in the convex cone lens of the preferred embodiment, total internal reflection of the incident beam can be achieved by an appropriate apex angle 610 such that the angle of incidence 612 with respect to the normal of the lateral surface 5 is greater than the critical angle of the lens material.

At temperature $T_0$, the incident ray, reflected at a point 605 on the lateral surface 5, is transmitted 611 through the lens body and exits at a point 606 on the bounding surface 603 of the lens. The dispersed beam 43 is received by the interior surface 81 of the ring lens, is transmitted 44 through the body of the ring lens, and is emitted from the exterior surface 82 as an orthogonal planar projection 45. At a different temperature $T_0+\Delta T$, due a change in the angle of refraction of the beam entering through the base 602 of the concave cone lens, the incident ray is reflected at a different point 607 on the lateral surface 5 and is transmitted along another path 610 through the lens body to exit at a different location 608 on the bounding surface 603 of the lens. Although the dispersed beam 609 is received by the interior surface 81 of the ring lens at a different location, the curvatures of the ring lens provides the necessary compensation, as discussed above, so that the projection emitted 47 from the exterior surface 82 of the ring lens remains planar and orthogonal to the optical axis 4. Note that, as for the prism faces of the double-prism ring, the curvature of the bounding surface 603 of the concave cone lens may also cooperate with the normalization and athermalization function of the ring lens 80.

2.4 Conical Reflector and Ring Lens

Figure 7:
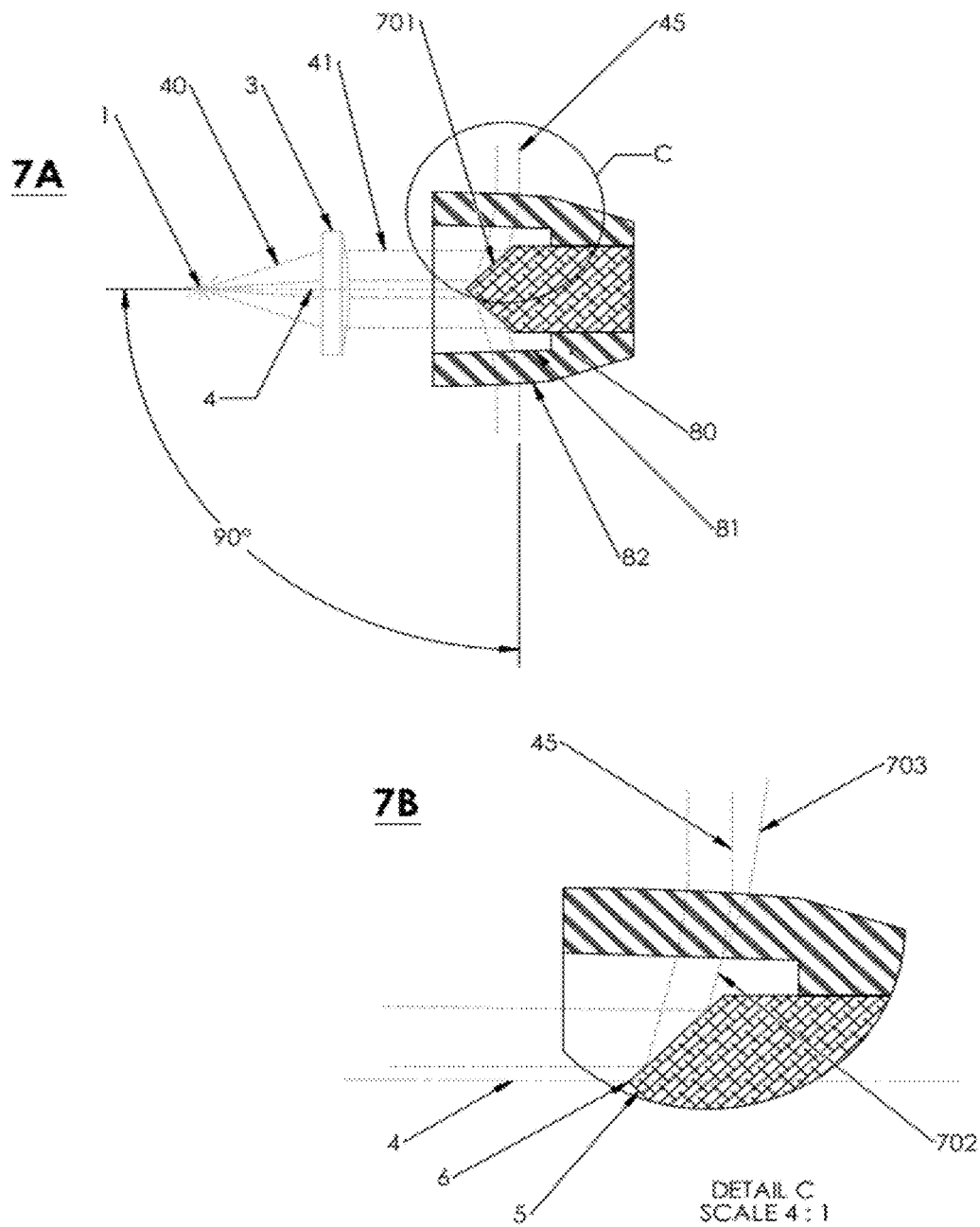
FIG. 7 is a diagrammatic cross-sectional view illustrating an alternate embodiment that utilizes conical reflector and a ring lens to generate laser planes.

The alternate embodiment shown in FIG. 7 illustrates a configuration in which only some of the technical advantages of the invention are realized. An orthogonal planar projection may be achieved by utilizing a conical reflector 701 and a coaxial ring lens 80. The incident beam 41 from laser source 1 is reflected and dispersed by the lateral surface 5 of the conical reflector. As discussed above, with the compensatory curvatures of the interior 81 and exterior 82 surfaces, the ring lens 80 normalizes the dispersed the beam 702 so that the resulting projection 45 is orthogonal to the optical axis 4.

Since dispersal of the incident beam is achieved purely by reflection, changes in temperature will only affect the light-propagating properties of the refractive ring lens. With a change in temperature from $T_0$ to $T_0+\Delta T$, the resulting projection will be deflected from a normalized plane 45 to a non-planar non-orthogonal projection 703, the character of which is determined by the thermoptic coefficient of the ring lens material and the curvatures of the ring-lens surfaces. Even though this limited embodiment does not realize the athermalization aspect of the invention, it may be sufficient or even desirable and cost-effective for less demanding applications. However, athermalization can be achieved by the precise cooperation between the curvatures of two refractive optical elements such as the beam-shaping lens 3 and the ring lens 80 or, as will be discussed below, by introducing another compensatory optical element.

2.5 Other Variations

Based on the teachings of the invention, other variations are possible including but not limited to the following embodiments.

In the limited embodiment of FIG. 7 which utilizes a conical reflector in combination with a ring lens, athermalization of planarity can be achieved by introducing a second coaxial ring lens with a torus diameter larger than that of the first ring lens 80. The projection 45 emitted from the exterior surface 82 of the first ring lens would be received by the interior surface of the second ring lens. With the two ring lenses cooperating to cancel any effects due to changes in temperature by a precise matching of surface curvatures, the resulting normalized and athermalized projection emitted from the exterior surface of the second ring lens will be orthogonal to the optical axis 4 throughout the operable temperature range.

In another variation, the axicon 7 in the alternate embodiment of FIG. 4 may be replaced by a conical reflector 701 of FIG. 7 to redirect the incident beam so that it is received by the double-prism ring 60. Consequently, without the axicon, the curvatures of the interior and exterior surfaces of the ring lens will be drawn to compensate only for the temperature-dependent properties of the double-prism ring (and the ring lens itself). In another variation, the alternate embodiment of FIG. 4 may be modified to consist only of the axicon and a prism-ring lens. The normalization and athermalization function of the ring lens 80 may be obtained by a prism-ring lens which contains a sufficient plurality of well-adapted prisms whose faces include curvatures drawn to provide the required compensation.

The foregoing variations illustrate different approaches to achieve athermalization by mutual-cancellation resulting from the combined effect of the temperature-dependent properties of two or more optical components. With a more generalized understanding of the teaching of the invention, the laser point source 1 and the axicon 7 of FIG. 4, 5, or 8 may be replaced by a commercially-available diffractive pattern generator. The circularly or conically dispersed projection produced by a diffractive pattern generator exhibiting temperature-dependent characteristics may be normalized and athermalized by the curvatures of the ring lens. Diffractive patterns may also be included on the optical surfaces of the ring lens to shape or collapse the planar projection into a useful geometry or to limit the planar projection so that only a portion is emitted to produce, for example, an optical protractor.

Figure 8:
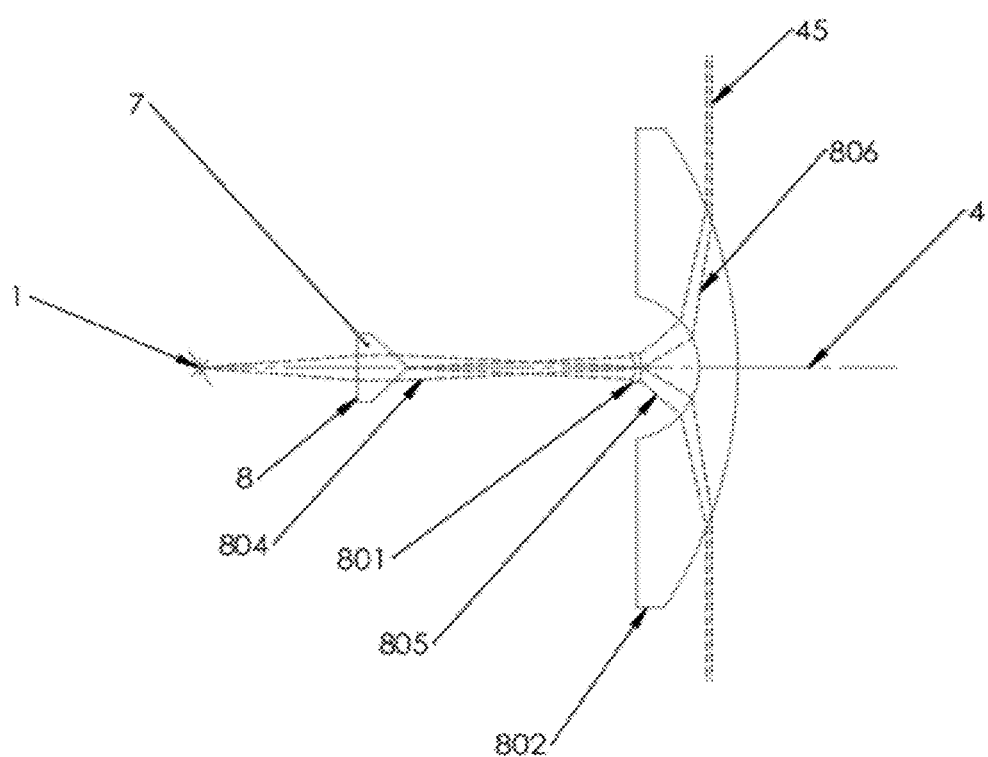
FIG. 8 is a diagrammatic cross-sectional view illustrating an alternate embodiment that utilizes spherical lenses adapted to generate laser planes.

Alternatively, the ring lens itself may replaced by a spherical lens or a plurality of spherical lenses to normalize and athermalize the dispersed beam. Shown in FIG. 8 is a compact configuration that includes two spherical lenses for normalizing the beam 804 dispersed by the axicon 7. The positive optical power, resulting from the combined effect of the first spherical divergent calibration lens 801 and the second spherical objective lens 802, focuses the dispersed Bessel beam 804 to produce the desired planar projection 45 that is orthogonal to the optical axis 4. During calibration, either the calibration lens 801 or the axicon 7, or both, is translated with respect to a fixed objective lens 802. Similar to that of the ring lens discussed above, the curvatures of the objective lens 802 are calculated to normalize and planarize the resulting projection 45 throughout the operable temperature range of the projection apparatus. Accounting for the angle and location of incidence of the beam emitted 805 by the calibration lens 801 within an operable temperature range and also for the thermoptic coefficient of the objective lens material itself, the curvatures of the objective lens can be determined in a manner analogous to that employed for the ring lens. Alternatively, cooperation between the calibration lens 801 and the objective lens 802 can be realized with appropriately drawn curvatures for both lenses.

Note that neither lens need be achromatic since the projection apparatus utilizes monochromatic laser sources. Also note that both lenses can be manufactured with traditional spherical-lens grinding methods or with an injection molding process that takes advantage of the optically-unused center portion of the lens. The spherical lens may also be plano-convex or plano-concave if the parameters of a specific application allows for reducing the interior or exterior surface into a plane. This possible reduction, which may minimize component costs, may also be applicable to the design of the ring lens. The interior or exterior surface of the ring lens may simply be a true cylindrical surface while only the curvature of other surface may be adapted for athermalization and normalization.

The foregoing variations accord with the spirit of the inventive concept. It is to be understood the invention teaches that, with the cooperation between at least two distinct optical elements with mutually-canceling thermoptic properties, athermalization may be realized so that the resulting laser reference projection remains planar throughout an operable temperature range. In the preferred and alternate embodiments, changes in direction of the dispersed beam due to changes in temperature are compensated by the precisely drawn curvatures of the ring lens which, in effect, spans the operable temperature range of the system. The ring lens, with its long focal length being more reasonably tolerant of positioning errors, allows for precise calibration, and is relatively insensitive to mechanical perturbations. Specifically, post-assembly calibration merely involves translating the ring lens (with respect to other components) along the axis of the optical assembly, thereby allowing more sensitive components such as cone lenses, reflectors, and prism-rings to be mechanically coupled, optically aligned (with respect to the incident beam), and securely positioned within the protective interior volume of the toroidal ring lens during the assembly operation of the manufacturing process. The invention, providing simultaneous solutions for the problems of planar accuracy, thermal stability, alignment sensitivity, and ruggedness, is directly applicable for use in the construction field and may benefit other industries with similarly demanding requirements.

We claim:

1. An apparatus for generating laser reference planar projections comprising of:
    a first, a second, and a third means for generating, respectively, a first, a second, and a third incident laser beam and for directing, respectively, said first, said second, and said third beam along, respectively, a first, a second, and a third central axial orientation;
    a first, a second, and a third means for dispersing, respectively, said first, said second, and said third incident beam along, respectively, said first, said second, and said third axial orientation, wherein said first, said second, and said third dispersing means are, respectively, fixed relative to said first, said second, and said third beam generating means; and
    a first, a second, and a third means for normalizing, respectively, said first, said second, and said third dispersed beam by optical refraction;
    wherein said apparatus is capable of projecting, respectively, a first, a second, and a third substantially uniform, substantially planar, and omnidirectional laser reference projection; and
    wherein the relative position between said first normalizing means and said first dispersing means, the relative position between said second normalizing means and said second dispersing means, and the relative position between said third normalizing means and said third dispersing means are operably aligned, such that said first, said second, and said third reference projections are substantially orthogonal, respectively, to said first, said second, and said third axial orientations, and such that said first, said second, and said third reference projections are of a character suitable for visual alignment, measurement, and guidance in the construction field.

2. The apparatus as in claim 1, wherein each said dispersing means comprises of a convex conical lens comprising of:
    an optical axis that is parallel to or coincidental with respective said axial orientation;
    a base surface adapted to receive respective said incident beam, wherein said base surface optionally includes a beam-shaping curvature having optical power; and
    a lateral surface of said conical lens adapted to initially reflect respective said incident beam by total internal reflection and subsequently to refractively disperse respective said reflected beam.

3. The apparatus as in claim 1, wherein each said dispersing means comprises of a concave conical lens comprising of:
    an optical axis that is parallel to or coincidental with respective said axial orientation;
    a cylindrical or tubular body;
    a conical concavity at a first end of said body;
    a base surface at a second end of said body adapted to receive respective said incident beam, wherein said base surface optionally includes a beam-shaping curvature having optical power;

a lateral surface of said conical concavity adapted to reflect respective said incident beam by total internal reflection; and a bounding circumferential surface of said lens adapted to refractively disperse respective said reflected beam.

4. The apparatus as in claim 1, wherein each said dispersing means comprises of a conical reflector with an axis of rotational symmetry that is parallel to or coincidental with respective said axial orientation, whereby respective said incident beam is received by the reflective lateral surface of said conical reflector and said reflective lateral surface disperses respective said beam.

5. The apparatus as in claim 4, wherein each said normalizing means further comprises of a ring lens comprising of:

an annular geometry with an axis of rotational symmetry that is parallel to or coincidental with respective said axial orientation;

an interior surface of said annular geometry, wherein said interior surface receives respective said dispersed beam;

an exterior surface of said annular geometry, wherein said exterior surface emits respective said beam; and said interior surface and said exterior surface adapted to provide beam-shaping curvature and, optionally, to include diffractive patterns;

wherein said curvature of said interior surface and/or said curvature of said exterior surface are adapted to further disperse respective said dispersed beam such that respective said further dispersed beam is substantially orthogonal to respective said orientation.

6. The apparatus as in claim 4, wherein each said dispersing means further comprises of a prism ring adapted to further disperse respective said dispersed beam, comprising of:

a plurality of annular prisms formed concentrically to a common axis of rotational symmetry, wherein said common axis is parallel or coincidental with respective said axial orientation, and wherein respective said beam is transmitted centrifugally through each said concentric annular prism of said prism ring;

a first surface of each said concentric prism adapted to receive respective said beam; and a second surface of each said concentric prism adapted to emit respective said beam, such that said first surface and said second surface of each said concentric prism further disperse respective said beam along respective said axial orientation.

7. The apparatus as in claim 1, wherein each said dispersing means comprises of a cone lens comprising of:

an optical axis that is parallel to or coincidental with respective said axial orientation;

a base surface that receives respective said incident beam; and a lateral surface that refractively disperses respective said beam.

8. The apparatus as in claim 7, wherein each said dispersing means further comprises of a prism ring adapted to further disperse respective said dispersed beam, comprising of:

a plurality of annular prisms formed concentrically to a common axis of rotational symmetry, wherein said common axis is parallel or coincidental with respective said axial orientation, and wherein respective said beam is transmitted centrifugally through each said concentric annular prism of said prism ring;

a first surface of each said concentric prism adapted to receive respective said beam;

and a second surface of each said concentric prism adapted to emit respective said beam, such that said first surface and said second surface of each said concentric prism further disperse respective said beam along respective said axial orientation.

9. The apparatus as in claim 7, wherein each said dispersing means further comprises of a reflector adapted to further disperse respective said dispersed beam, comprising of: a reflective surface that is a closed sphere, a hemisphere, or a spherical sector, wherein the geometric center of said spherical reflective surface is located on respective said axial orientation, and wherein said reflective surface is adapted to receive respective said dispersed beam and to further disperse respective said beam along respective said axial orientation.

10. The apparatus as in claim 1, wherein each said generating means comprises of a donut-mode laser generator or a diffractive pattern generator for generating respective said incident beam, wherein respective said beam is substantially annular in cross-section.

11. The apparatus as in claim 10, wherein each said dispersing means comprises of a prism ring adapted to disperse respective said incident beam, comprising of:

a plurality of annular prisms formed concentrically to a common axis of rotational symmetry, wherein said common axis is parallel or coincidental with respective said axial orientation, and wherein respective said beam is transmitted centrifugally through each said concentric annular prism of said prism ring;

a first surface of each said concentric prism adapted to receive respective said beam;

and a second surface of each said concentric prism adapted to emit respective said beam, such that said first surface and said second surface of each said concentric prism disperse respective said beam along respective said axial orientation.

12. The apparatus as in claim 10, wherein each said dispersing means comprises of a reflector adapted to disperse respective said incident beam, comprising of: a reflective surface that is a closed sphere, a hemisphere, or a spherical sector, wherein the geometric center of said spherical reflective surface is located on respective said axial orientation, and wherein said reflective surface is adapted to receive respective said dispersed beam and to disperse respective said beam along respective said axial orientation.

13. The apparatus as in claim 7 or 10, wherein each said normalizing further means comprises of:

a first spherical lens; and a second spherical lens;

wherein the optical axes of said first spherical lens and said second spherical lens are coincident with respective said axial orientation, wherein the curvature of said second spherical lens is adapted to the optical properties of respective said dispersing means and respective said normalizing means, and wherein said first spherical lens receives respective said dispersed beam, said second spherical lens receives said beam divergently emitted from said first spherical lens, and said second spherical lens projects said beam as respective said projection, such that respective said projection is substantially orthogonal to respective said axial orientation throughout an operable temperature range of said projection apparatus.

14. The apparatus as in claim 2, 3, 5, 6, 7, 8, 9, 11, or 12 wherein each said normalizing means further comprises of a ring lens comprising of:

an annular geometry with an axis of rotational symmetry that is parallel to or coincidental with respective said axial orientation;

an interior surface of said annular geometry, wherein said interior surface receives respective said dispersed beam;

an exterior surface of said annular geometry, wherein said exterior surface emits respective said beam; and said interior surface and said exterior surface adapted to provide beam-shaping curvature and, optionally, to include diffractive patterns;

wherein said curvature of said interior surface and/or said curvature of said exterior surface are adapted to the optical properties of respective said dispersing means and respective said normalizing means such that respective said projection is substantially orthogonal to respective said orientation throughout an operable temperature range of said projection apparatus.

15. The apparatus as in claim 1, wherein each said generating means comprises of a path-compression prism assembly comprising of:

a means for redirecting respective said generated beam into and out of a path-compression plane, wherein said path-compression plane is substantially orthogonal to the direction of said redirected beam into and out of said path-compression plane; and a means for providing a plurality of mutually-facing reflective surfaces, wherein said reflective surfaces reflect said redirected beam in a closed circuitous path, and wherein said path-compression plane is defined by said closed circuitous path.

16. The apparatus as in claim 15, wherein said redirecting means comprises of two angle-based right-triangular optical elements joined at their respective base surfaces, wherein both said base surfaces are reflective or only one said base surface is characterized by double-sided reflectivity.

17. The apparatus as in claim 15, wherein said means for providing a plurality of mutually-facing reflective surfaces comprises of two Porro prisms, four right-angle prisms, or four mirrors.

18. The apparatus as in claim 1, further comprising of a means for shielding each said dispersing means and each said normalizing means, wherein said shielding means comprises of:

a means for attaching said shielding means to respective said normalizing means; and a means for enclosing respective said dispersing means and respective said normalizing means in a first position, wherein said enclosing means is adjustable to a second position, and wherein said enclosing means in said second position does not occlude or obstruct respective said laser reference projection.

19. The apparatus as in claim 18, wherein said attaching means comprises of a cylindrical geometry adapted to be attached to and concentric with said normalizing means, and a threaded exterior circumferential surface; and wherein said enclosing means further comprises of a cylindrical geometry of a length no less than the distance between said first position and said second position, and a threaded interior surface adapted to mesh with said threaded outer surface of said attaching means.

20. The apparatus as in claim 18, wherein said attaching means comprises of a cylindrical geometry adapted to be attached to and concentric with said normalizing means, and an O-ring circumscribing an exterior circumferential surface; and wherein said enclosing means further comprises of a cylindrical geometry, and an interior surface slidably adapted to said outer surface of said attaching means, with said interior surface comprising of a first circumferential groove to receive said O-ring in said first position and a second circumferential groove to receive said O-ring in said second position.

21. The apparatus as in claim 18, wherein said attaching means comprises of a cylindrical geometry adapted to be attached to and concentric with said normalizing means and said enclosing means; and wherein said enclosing means further comprises of a flexible elastomer mold, such that the elasticity, thicknesses, and curvatures of said mold are adapted for bi-stable deformation of said mold into a first shape corresponding to said first position and a second shape corresponding to said second position.

22. The apparatus as in claim 18, wherein said attaching means comprises of a cylindrical geometry adapted to be attached to and concentric with said normalizing means and said enclosing means; and wherein said enclosing means further comprises of a volute compression spring adapted for an uncompressed state corresponding to said first position and a compressed state corresponding to said second position, such that said spring in said uncompressed state is characterized by contiguous coils forming a continuous surface and said spring is maintained in said compressed state by a latching means.

23. The apparatus as in claim 18, wherein said shielding means further comprises of said attaching means comprises of a cylindrical geometry adapted to be attached to and concentric with said normalizing means and said enclosing means; and wherein said enclosing means further comprises of a volute tension spring adapted for an unstretched state corresponding to said second position and a stretched state corresponding to said first position, such that said spring in said stretched state is characterized by contiguous coils forming a continuous surface and said spring is maintained in said stretched state by a latching means.

24. The apparatus as in claim 1, wherein said first, said second, and said third axial orientations are substantially mutually orthogonal, whereby said apparatus is capable of projecting said first, said second, and said third laser reference projections that are substantially mutually orthogonal.

25. The apparatus as in claim 1, wherein said first and said second axial orientations are substantially mutually orthogonal, whereby said apparatus is capable of projecting said first and said second laser reference projections that are substantially mutually orthogonal.

26. The apparatus as in claim 24 or 25, further comprising of an extendible tripod support structure comprising of:

an extendible first leg;

an extendible second leg;

an extendible third leg;

a platform adapted for mounting said projection apparatus; and a means for securing said projection apparatus to said platform;

wherein a first end of said first leg is substantially orthogonally fixed to said platform, wherein a first end of said second leg and a first end of said third leg are pivotally attached to said platform, wherein said second leg and said third leg optionally comprise of a weighted means and/or anchoring means at or near their respective second end, and wherein the range of adjustability of said first leg and said second leg is constrained within a quadrant delineated by the intersection of said first reference projection and said second reference projection.

27. A method for converting an incident beam of electromagnetic radiation into a substantially planar projection comprising the steps of:

dispersing said incident beam along a particular axial orientation; and normalizing said dispersed beam by optical refraction to produce a substantially uniform and substantially planar projection;

wherein said dispersing step is accomplished by a means for dispersing said incident beam, said normalizing step is accomplished by a means for normalizing said dispersed beam, and said normalizing step further comprises of the step of aligning said normalizing means with respect to said dispersing means; and wherein said aligning step is accomplished by a relative translation between said normalizing means and said dispersing means along the axis of said orientation such that said projection is substantially planar and substantially orthogonal to said orientation.

28. The method as in claim 27, wherein said dispersing means comprises of a convex conical lens comprising of:
an optical axis that is parallel to or coincidental with said axial orientation;
a base surface adapted to receive said incident beam, wherein said base surface optionally includes a beam-shaping curvature having optical power; and
a lateral surface of said conical lens adapted to initially reflect said incident beam by total internal reflection and subsequently to refractively disperse said reflected beam.

29. The method as in claim 27, wherein said dispersing means comprises of a concave conical lens comprising of:
an optical axis that is parallel to or coincidental with said axial orientation;
a cylindrical or tubular body;
a conical concavity at a first end of said body;
a base surface at a second end of said body adapted to receive said incident beam, wherein said base surface optionally includes a beam-shaping curvature having optical power;
a lateral surface of said conical concavity adapted to reflect said incident beam by total internal reflection; and
a bounding circumferential surface of said lens adapted to refractively disperse said reflected beam.

30. The method as in claim 27, wherein said dispersing means comprises of a conical reflector with an axis of rotational symmetry that is parallel to or coincidental with said axial orientation, whereby said incident beam is received by the reflective lateral surface of said conical reflector and said reflective lateral surface disperses said beam.

31. The method as in claim 30, wherein said normalizing means further comprises of a ring lens comprising of:
an annular geometry with an axis of rotational symmetry that is parallel to or coincidental with said axial orientation;
an interior surface of said annular geometry, wherein said interior surface receives said dispersed beam;
an exterior surface of said annular geometry, wherein said exterior surface emits said beam; and
said interior surface and said exterior surface adapted to provide beam-shaping curvature and, optionally, to include diffractive patterns;
wherein said curvature of said interior surface and/or said curvature of said exterior surface are adapted to further disperse said dispersed beam such that said further dispersed beam is substantially orthogonal to said orientation.

32. The method as in claim 30, wherein said dispersing means further comprises of a prism ring adapted to further disperse said dispersed beam, comprising of:
a plurality of annular prisms formed concentrically to a common axis of rotational symmetry, wherein said common axis is parallel or coincidental with said axial orientation, and wherein said beam is transmitted centrifugally through each said concentric annular prism of said prism ring;
a first surface of each said concentric prism adapted to receive said beam; and
a second surface of each said concentric prism adapted to emit said beam, such that said first surface and said second surface of each said concentric prism further disperse said beam along said axial orientation.

33. The method as in claim 27, wherein each said dispersing means comprises of a cone lens comprising of:
an optical axis that is parallel to or coincidental with said axial orientation;
a base surface that receives said incident beam; and
a lateral surface that refractively disperses said beam.

34. The method as in claim 33, wherein said dispersing means further comprises of a prism ring adapted to further disperse said dispersed beam, comprising of: a plurality of annular prisms formed concentrically to a common axis of rotational symmetry, wherein said common axis is parallel or coincidental with said axial orientation, and wherein said beam is transmitted centrifugally through each said concentric annular prism of said prism ring;
a first surface of each said concentric prism adapted to receive said beam; and
a second surface of each said concentric prism adapted to emit said beam, such that said first surface and said second surface of each said concentric prism further disperse said beam along said axial orientation.

35. The method as in claim 33, wherein said dispersing means further comprises of a reflector adapted to further disperse said dispersed beam, comprising of: a reflective surface that is a closed sphere, a hemisphere, or a spherical sector, wherein the geometric center of said spherical reflective surface is located on said axial orientation, and wherein said reflective surface is adapted to receive said dispersed beam and to further disperse said beam along said axial orientation.

36. The method as in claim 33, wherein said normalizing further means comprises of:
a first spherical lens; and
a second spherical lens;
wherein the optical axes of said first spherical lens and said second spherical lens are coincident with said axial orientation, wherein the curvature of said second spherical lens is adapted to the optical properties of said dispersing means and said normalizing means, and
wherein said first spherical lens receives said dispersed beam, said second spherical lens receives said beam divergently emitted from said first spherical lens, and said second spherical lens projects said beam as said projection, such that said projection is substantially orthogonal to said axial orientation throughout an operable temperature range.

37. The method as in claim 28, 29, 31, 32, 33, 34, or 35 wherein said normalizing means further comprises of a ring lens comprising of:
an annular geometry with an axis of rotational symmetry that is parallel to or coincidental with said axial orientation;
an interior surface of said annular geometry, wherein said interior surface receives said dispersed beam;
an exterior surface of said annular geometry, wherein said exterior surface emits said beam; and said interior surface and said exterior surface adapted to provide beam-shaping curvature and, optionally, to include diffractive patterns;

wherein said curvature of said interior surface and/or said curvature of said exterior surface are adapted to the optical properties of said dispersing means and said normalizing means such that said projection is substantially orthogonal to said orientation throughout an operable temperature range.

38. An optical device for converting an incident beam of electromagnetic radiation along a particular axial orientation into a substantially planar projection comprising of:

a means for dispersing said incident beam along said axial orientation; and a means for normalizing said dispersed beam by optical refraction;

wherein the relative position of said normalizing means with respect to said dispersing means is operably aligned such that said projection is substantially orthogonal to said orientation, whereby said optical device is capable of projecting a substantially uniform, substantially planar, and omnidirectional projection.

39. The optical device as in claim 38, wherein said dispersing means comprises of a convex conical lens comprising of:

an optical axis that is parallel to or coincidental with said axial orientation;

a base surface adapted to receive said incident beam, wherein said base surface optionally includes a beam-shaping curvature having optical power; and a lateral surface of said conical lens adapted to initially reflect said incident beam by total internal reflection and subsequently to refractively disperse said reflected beam.

40. The optical device as in claim 38, wherein said dispersing means comprises of a concave conical lens comprising of:

an optical axis that is parallel to or coincidental with said axial orientation;

a cylindrical or tubular body, a conical concavity at a first end of said body;

a base surface at a second end of said body adapted to receive said incident beam, wherein said base surface optionally includes a beam-shaping curvature having optical power;

a lateral surface of said conical concavity adapted to reflect said incident beam by total internal reflection; and a bounding circumferential surface of said lens adapted to refractively disperse said reflected beam.

41. The optical device as in claim 38, wherein said dispersing means comprises of a conical reflector with an axis of rotational symmetry that is parallel to or coincidental with said axial orientation, whereby said incident beam is received by the reflective lateral surface of said conical reflector and said reflective lateral surface disperses said beam.

42. The optical device as in claim 41, wherein said normalizing means further comprises of a ring lens comprising of:

an annular geometry with an axis of rotational symmetry that is parallel to or coincidental with said axial orientation;

an interior surface of said annular geometry, wherein said interior surface receives said dispersed beam;

an exterior surface of said annular geometry, wherein said exterior surface emits said beam; and said interior surface and said exterior surface adapted to provide beam-shaping curvature and, optionally, to include diffractive patterns;

wherein said curvature of said interior surface and/or said curvature of said exterior surface are adapted to further disperse said dispersed beam such that said further dispersed beam is substantially orthogonal to said orientation.

43. The optical device as in claim 41, wherein said dispersing means further comprises of a prism ring adapted to further disperse said dispersed beam, comprising of:

a plurality of annular prisms formed concentrically to a common axis of rotational symmetry, wherein said common axis is parallel or coincidental with said axial orientation, and wherein said beam is transmitted centrifugally through each said concentric annular prism of said prism ring;

a first surface of each said concentric prism adapted to receive said beam; and a second surface of each said concentric prism adapted to emit said beam, such that said first surface and said second surface of each said concentric prism further disperse said beam along said axial orientation.

44. The optical device as in claim 38, wherein each said dispersing means comprises of a cone lens comprising of:

an optical axis that is parallel to or coincidental with said axial orientation;

a base surface that receives said incident beam; and a lateral surface that refractively disperses said beam.

45. The optical device as in claim 44, wherein said dispersing means further comprises of a prism ring adapted to further disperse said dispersed beam, comprising of:

a plurality of annular prisms formed concentrically to a common axis of rotational symmetry, wherein said common axis is parallel or coincidental with said axial orientation, and wherein said beam is transmitted centrifugally through each said concentric annular prism of said prism ring;

a first surface of each said concentric prism adapted to receive said beam; and a second surface of each said concentric prism adapted to emit said beam, such that said first surface and said second surface of each said concentric prism further disperse said beam along said axial orientation.

46. The optical device as in claim 44, wherein said dispersing means further comprises of a reflector adapted to further disperse said dispersed beam, comprising of: a reflective surface that is a closed sphere, a hemisphere, or a spherical sector, wherein the geometric center of said spherical reflective surface is located on said axial orientation, and wherein said reflective surface is adapted to receive said dispersed beam and to further disperse said beam along said axial orientation.

47. The optical device as in claim 44, wherein said normalizing further means comprises of:

a first spherical lens; and a second spherical lens;

wherein the optical axes of said first spherical lens and said second spherical lens are coincident with said axial orientation, wherein the curvature of said second spherical lens is adapted to the optical properties of said dispersing means and said normalizing means, and wherein said first spherical lens receives said dispersed beam, said second spherical lens receives said beam divergently emitted from said first spherical lens, and said second spherical lens projects said beam as said projection, such that said projection is substantially orthogonal to said axial orientation throughout an operable temperature range of said optical device.

48. The optical device as in claim 39, 40, 42, 43, 44, 45, or 46 wherein said normalizing means further comprises of a ring lens comprising of:

an annular geometry with an axis of rotational symmetry that is parallel to or coincidental with said axial orientation;

an interior surface of said annular geometry, wherein said interior surface receives said dispersed beam;

an exterior surface of said annular geometry, wherein said exterior surface emits said beam; and said interior surface and said exterior surface adapted to provide beam-shaping curvature and, optionally, to include diffractive patterns;

wherein said curvature of said interior surface and/or said curvature of said exterior surface are adapted to the optical properties of said dispersing means and said normalizing means such that said projection is substantially orthogonal to said orientation throughout an operable temperature range of said optical device.

49. A stackable in-line optical device for compressing the optical path of an incident beam of electromagnetic radiation comprising of:

a means for redirecting said incident beam into and out of a path-compression plane, wherein said path-compression plane is substantially orthogonal to the direction of said redirected beam into and out of said path-compression plane; and a means for providing a plurality of mutually-facing reflective surfaces, wherein said reflective surfaces reflect said redirected beam in a closed circuitous path, and wherein said path-compression plane is defined by said closed circuitous path.

50. The optical device as in claim 49, wherein said redirecting means comprises of two angle-based right-triangular optical elements joined at their respective base surfaces, wherein both said base surfaces are reflective or only one said base surface is characterized by double-sided reflectivity.

51. The optical device as in claim 49, wherein said means for providing a plurality of mutually-facing reflective surfaces comprises of two Porro prisms, four right-angle prisms, or four mirrors.

* * * * *